United States Patent

Washington

[15] 3,651,487

[45] Mar. 21, 1972

[54] PRINTER CONTROL SYSTEM

[72] Inventor: Richard S. Washington, Reston, Va.

[73] Assignee: International Business Machines Corporation, Armonk, N.Y.

[22] Filed: Dec. 9, 1969

[21] Appl. No.: 883,528

[52] U.S. Cl. ............................................340/172.5, 101/93

[51] Int. Cl. ............................................G11c 9/00

[58] Field of Search ..........................340/172.5, 173; 101/93

[56] References Cited

UNITED STATES PATENTS

| | | | |
|---|---|---|---|
| 3,248,708 | 4/1966 | Haynes | 340/172.5 |
| 3,284,777 | 11/1966 | Carlstrom et al. | 340/172.5 |
| 3,292,152 | 12/1966 | Barton | 340/172.5 |
| 3,307,153 | 2/1967 | Bauer | 340/172.5 |
| 3,343,131 | 9/1967 | Bloom, Jr. et al | 340/172.5 |
| 3,371,323 | 2/1968 | Taub | 340/173 |
| 3,408,633 | 10/1968 | Shimabukuro | 101/93 X |

*Primary Examiner*—Paul J. Henon

*Assistant Examiner*—Paul R. Woods

*Attorney*—Hanifin and Jancin and Francis V. Giolma

[57] ABSTRACT

A printer utilizes a core storage print buffer for characters to be printed, and a read only storage device for document carriage or format control and type chain character reference. The carriage control and type chain character portions of the read only storage device, and the print buffer all have a common data register used for readout to print or operate the carriage.

11 Claims, 32 Drawing Figures

INVENTOR.
RICHARD S. WASHINGTON
BY Francis V. Giolma
ATTORNEY

PATENTED MAR 21 1972 3,651,487

SHEET 06 OF 28

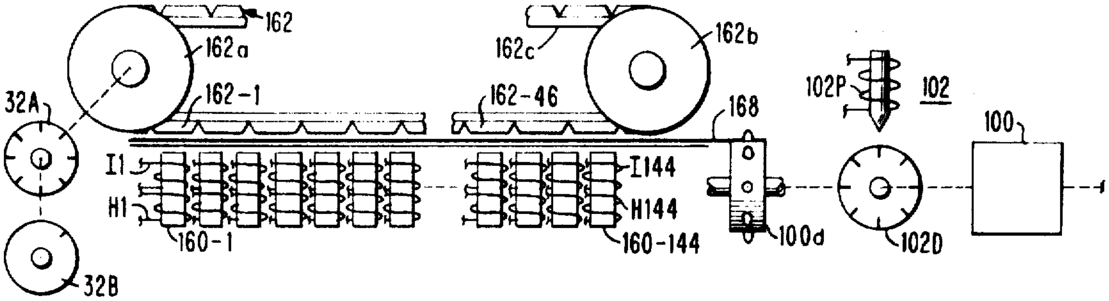

FIG. 10

| DATA REGISTER | 8 | 7 | 6 | 5 | 2 | 3 | 4 |
|---|---|---|---|---|---|---|---|
| BCD CODE | C/WM | B | A | 8 | 4 | 2 | 1 |
| COMMAND REGISTER | — | SKIP | — | 8 | 4 | 2 | 1 |
| OPERATION | | | | | | | |
| NO OPERATION | | | X | | | | |
| SINGLE SPACE WITHOUT PRINTING | X | | X | | | | X |
| DOUBLE SPACE WITHOUT PRINTING | X | | X | | | X | |
| TRIPLE SPACE WITHOUT PRINTING | | | X | | | X | X |
| SKIP TO CHANNEL 1 WITHOUT PRINTING | | X | X | | | | X |
| " " " 2 " " | | X | X | | | X | |
| " " " 3 " " | X | X | X | | | X | X |
| " " " 4 " " | | X | X | | X | | |
| " " " 5 " " | X | X | X | | X | | X |
| " " " 6 " " | X | X | X | | X | X | |
| " " " 7 " " | | X | X | | X | X | X |
| " " " 8 " " | | X | X | X | | | |
| " " " 9 " " | X | X | X | X | | | X |
| " " " 10 " " | X | X | X | X | | X | |
| " " " 11 " " | | X | X | X | | X | X |
| " " " 12 " " | X | X | X | X | X | | |
| " " " 13 " " | | X | X | X | X | | X |

TABLE 1

IMMEDIATE CARRIAGE OPERATIONS

FIG. 5

| DATA REGISTER | 8 | 7 | 6 | 5 | 2 | 3 | 4 |
|---|---|---|---|---|---|---|---|
| BCD CODE | C/WM | B | A | 8 | 4 | 2 | 1 |
| COMMAND REGISTER | — | SKIP | — | 8 | 4 | 2 | 1 |
| OPERATION | | | | | | | |
| PRINT WITH NO CARRIAGE MOTION | X | | | | | | |
| PRINT AND SINGLE SPACE | | | | | | | X |
| PRINT AND DOUBLE SPACE | | | | | | X | |
| PRINT AND TRIPLE SPACE | X | | | | | X | X |
| PRINT AND SKIP TO CHANNEL 1 | X | X | | | | | X |
| " " " " " 2 | X | X | | | | X | |
| " " " " " 3 | | X | | | | X | X |
| " " " " " 4 | X | X | | | X | | |
| " " " " " 5 | | X | | | X | | X |
| " " " " " 6 | | X | | | X | X | |
| " " " " " 7 | X | X | | | X | X | X |
| " " " " " 8 | X | X | | X | | | |
| " " " " " 9 | | X | | X | | | X |
| " " " " " 10 | | X | | X | | X | |
| " " " " " 11 | X | X | | X | | X | X |
| " " " " " 12 | | X | | X | X | | |
| " " " " " 13 | X | X | | X | X | | X |

TABLE 2

PRINT AND CARRIAGE CONTROL OPERATIONS

FIG. 6

FORMAT SEARCH SEQUENCE CHART

TABLE 3

| NUMERICAL DESIGNATOR OF CHANNEL IN SKIP COMMAND | FUNCTION | ROS CODE |
|---|---|---|
| 1 | HEADING LINE | 1 NOT 2 |
| 2 | NORMAL SKIP | 1 ST 2 NOT 1 |
| 3 | NORMAL SKIP | 2ND 2 NOT 1 |
| 4 | " " | 3RD 2 NOT 1 |
| 5 | " " | 4 TH 2 NOT 1 |
| 6 | " " | 5TH 2 NOT 1 |
| 7 | " " | 6TH 2 NOT 1 |
| 8 | " " | 7 TH 2 NOT 1 |
| 9 | 1 ST OVERFLOW | 1 ST 1 AND 2 |
| 10 | NORMAL SKIP | 8TH 2 NOT 1 |
| 11 | " " | 9TH 2 NOT 1 |
| 12 | 2ND OVERFLOW | 2ND 1 AND 2 |
| 13 | REPETITIVE SKIP | NEXT 2 NOT 1 |

ROS CARRIAGE CONTROL CODES

PRINTER CONTROL SYSTEM

CROSS-REFERENCE TO RELATED APPLICATIONS

The subject invention is related to and is an improvement over the inventions of copending applications, Ser. Nos. 601,888, now U.S. Pat. No. 3,502,190 filed Dec. 15, 1966, and 661,929, now U.S. Pat. No. 3,499,516 filed Aug. 21, 1967, of John L. Smith and Frederick Schaaf, entitled "Tapeless Carriage Control System" and "Tapeless Carriage Control," and now U.S. Pat. No. 3,502,190 issued Mar. 24, 1970, and U.S. Pat. No. 3,499,516, issued Mar. 10, 1970, respectively.

BRIEF SUMMARY OF THE INVENTION

Generally stated, it is an object of the invention to provide an improved control system for a printer.

More specifically, it is an object of the invention to provide an inexpensive and reliable read only storage carriage control system for a printer.

Another object of the invention is to provide for using a single register for different bit portions of a storage device during different portions of an operating cycle.

It is also an object of the invention to provide for using the same data register for two different storage devices in a printer control system.

Yet another object of the invention is to provide for using a print line buffer address register to also check operation of printer carriage motion.

Still another object of the invention is to provide for comparing a character on a type chain with a character to be printed in a print position at which the character on the type chain is located, by adding the coded representation of the one to the coded representation of the other in a register, in a binary fashion.

It is also an important object of this invention to provide for using a read only character storage device as a source to repeatedly load a print line buffer with data to be printed, and incrementing the starting value for buffer loading by one each line, so as to produce a diagonal print test pattern of the characters in the read only storage device.

Still another important object of the invention is to provide for checking the operation of a carriage in a printer by comparing the condition of the units position of a line counter, which is advanced each time there is a call for a line of carriage motion with that of a check trigger which is driven as a binary counter by emitter pulses from actual movement of the carriage.

It is also another object of this invention to provide for using a line counter to address a read only storage device during carriage control operations, and a character counter for addressing the read only storage device for character compare operations with a character in a print buffer.

Yet another object of the invention is to provide for using an address counter to address a buffer storage device containing character representations of characters to be printed, and for using the address counter 1 and 2 position triggers for counting document heading line carriage control codes during a format searching operation.

Another important object of the invention is to simulate a 12-channel carriage control tape with only 64 words of five bits each available.

Still another important object of the invention is to provide for recognizing a Line Complete condition when the core storage buffer contains all coded blank space representations so as to eliminate the need for an extra core plane in the buffer to determine this condition.

The foregoing and other objects, features, and advantages of the invention will be apparent from the following more particular description of a preferred embodiment of the invention as illustrated in the accompanying drawing.

Figure 1:
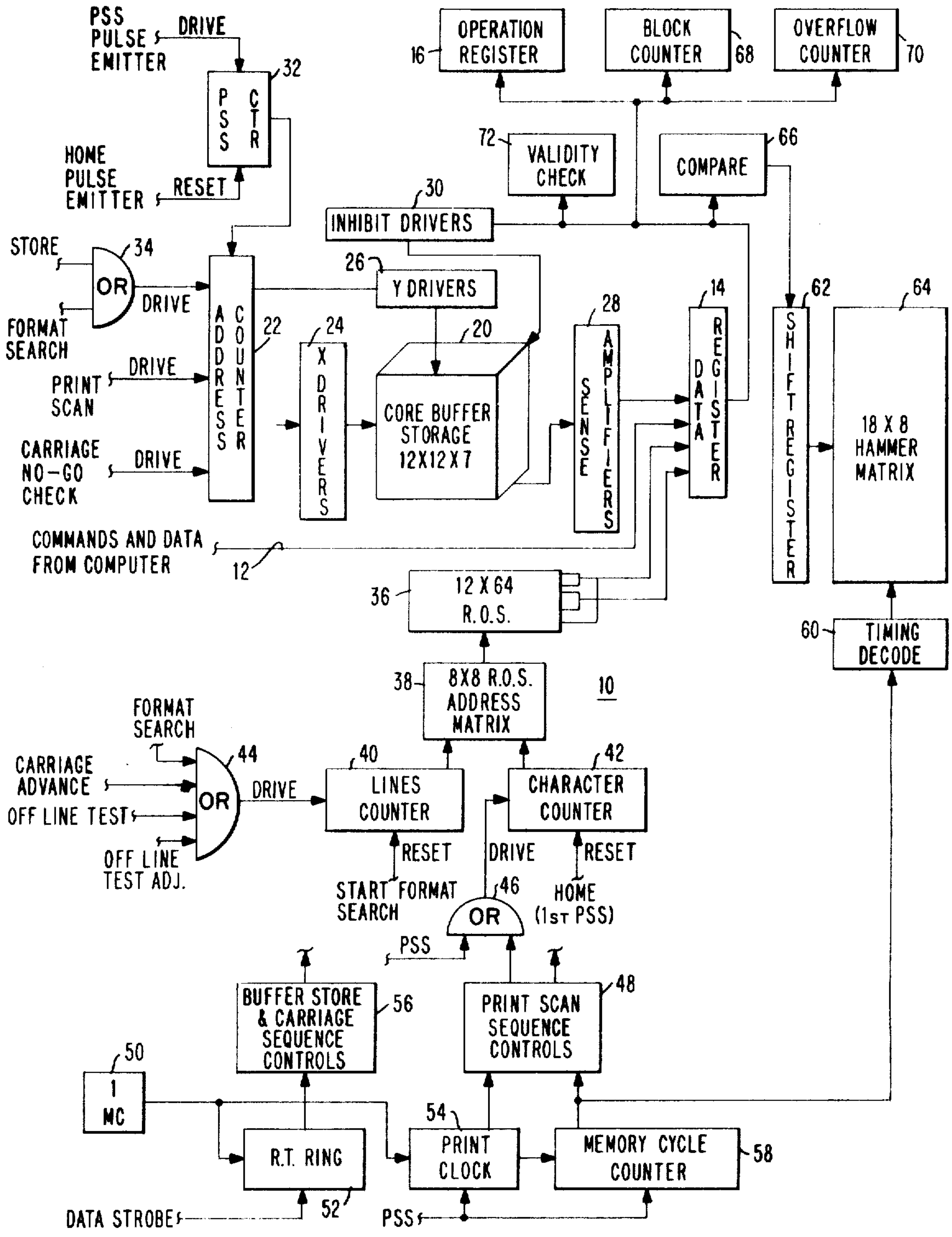
FIG. 1 is a schematic block diagram of a printer control system embodying the invention in one of its forms.

FIGS. *3a–3u* together provide a schematic circuit diagram of the printer control system of FIG. 1.

Figure 3A:
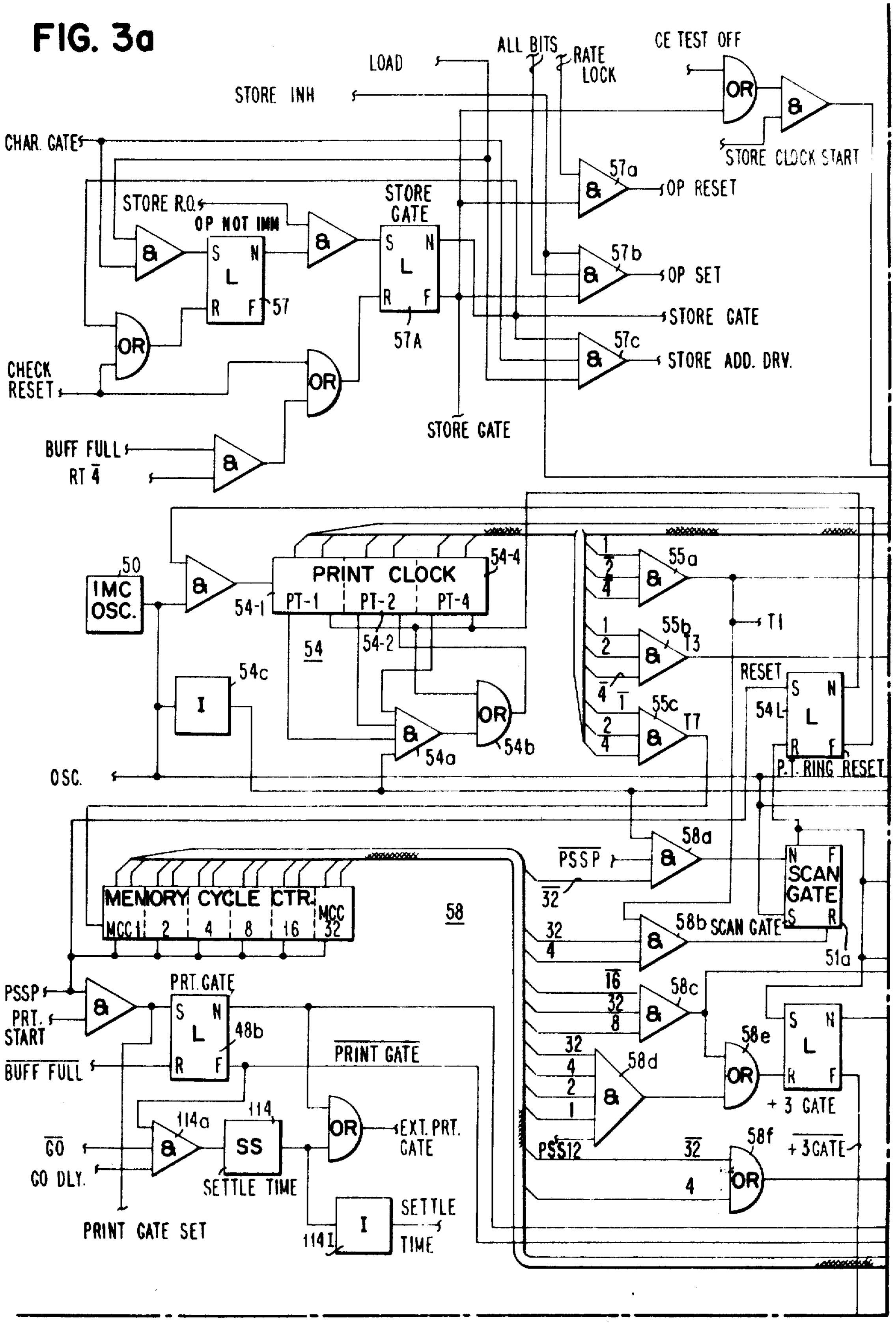
Figure 3B:
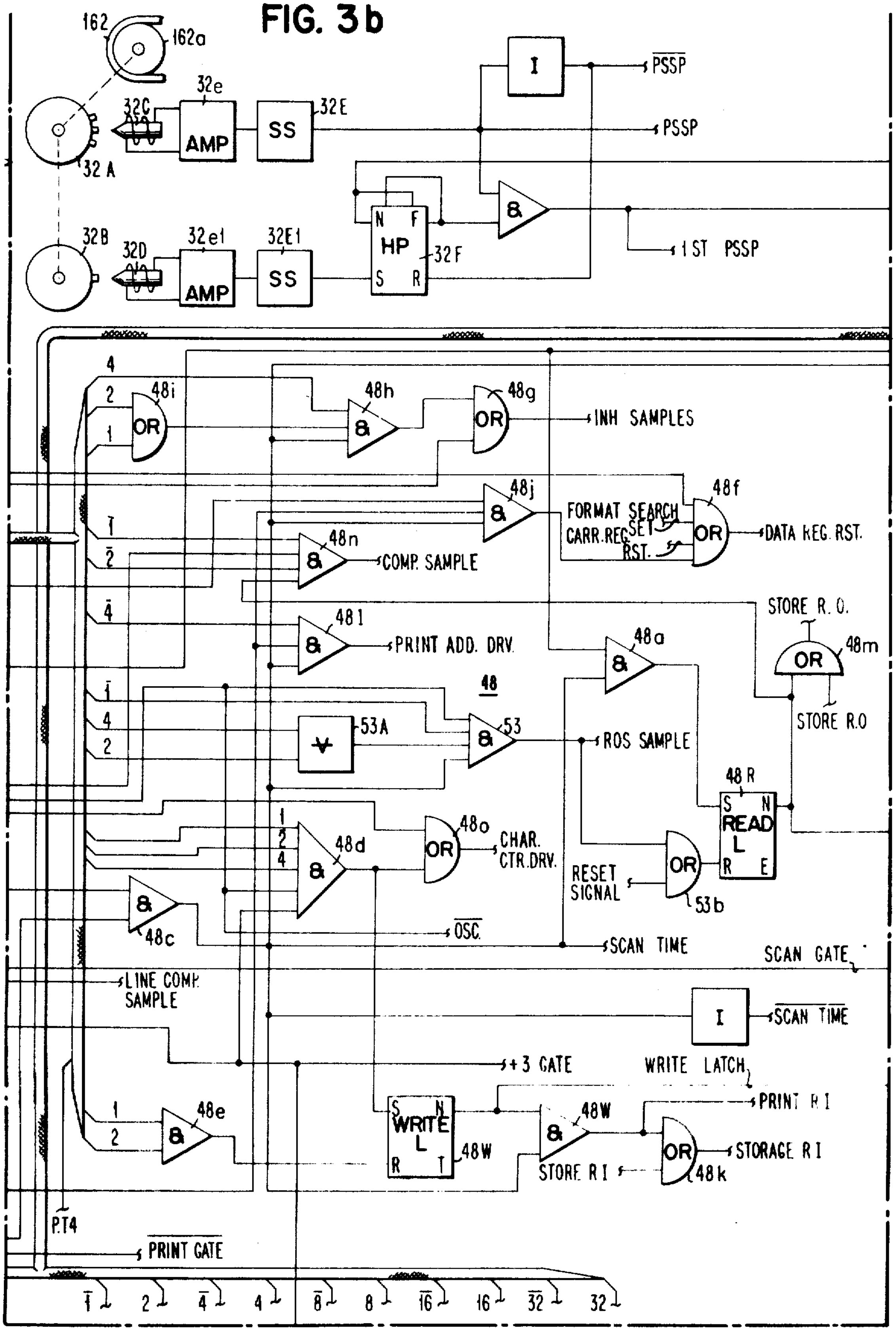
Figure 3C:
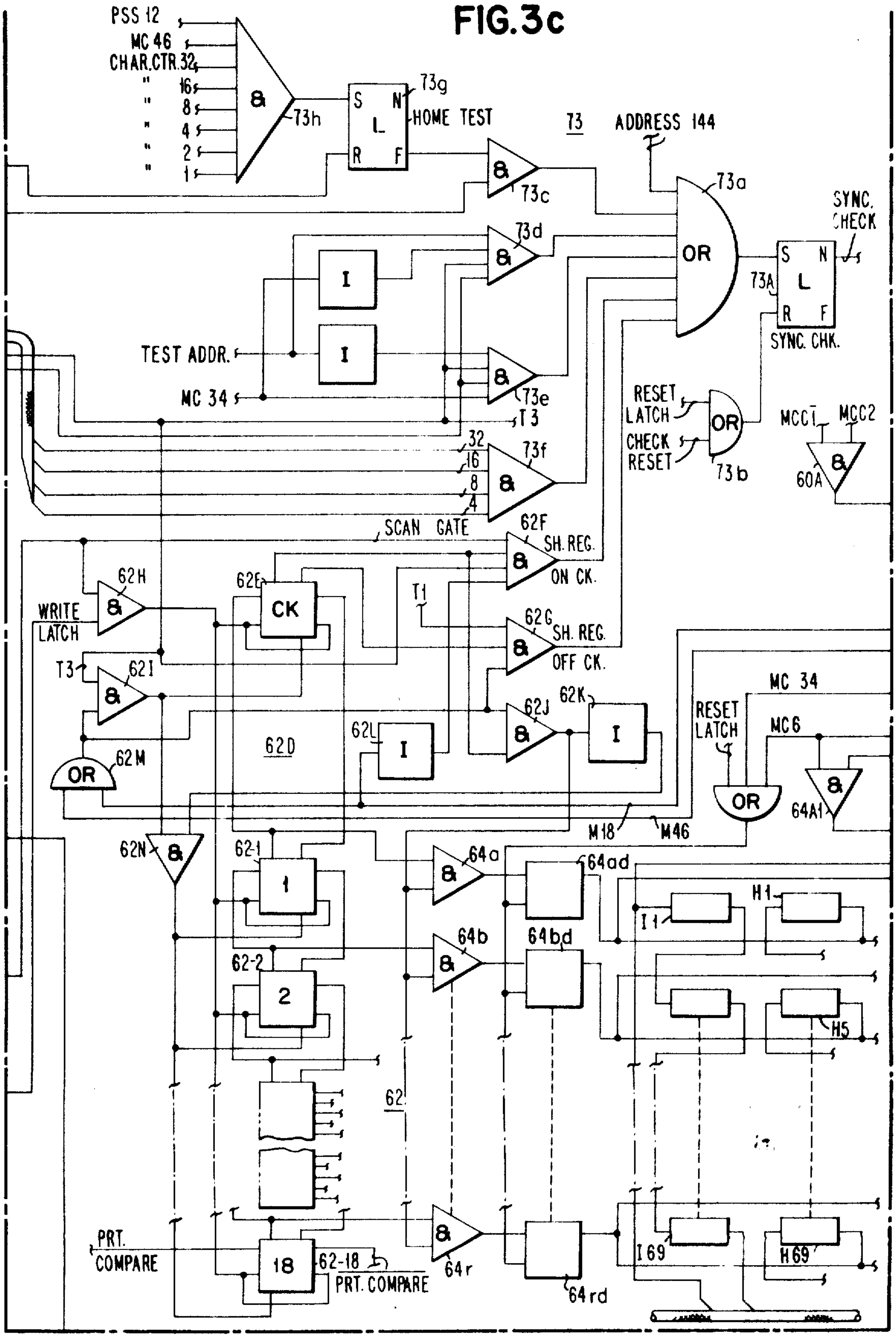
Figure 3D:
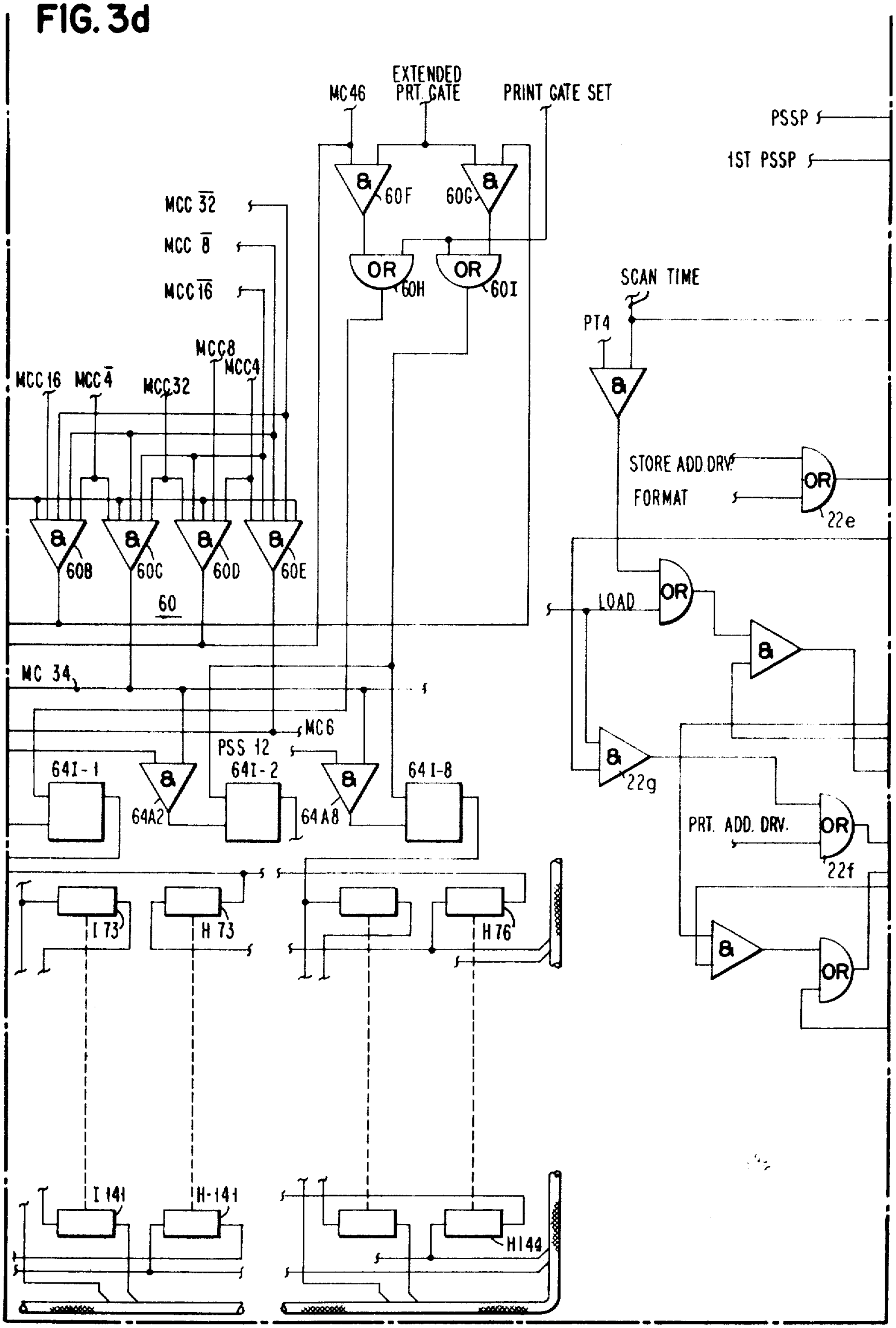
Figure 3E:
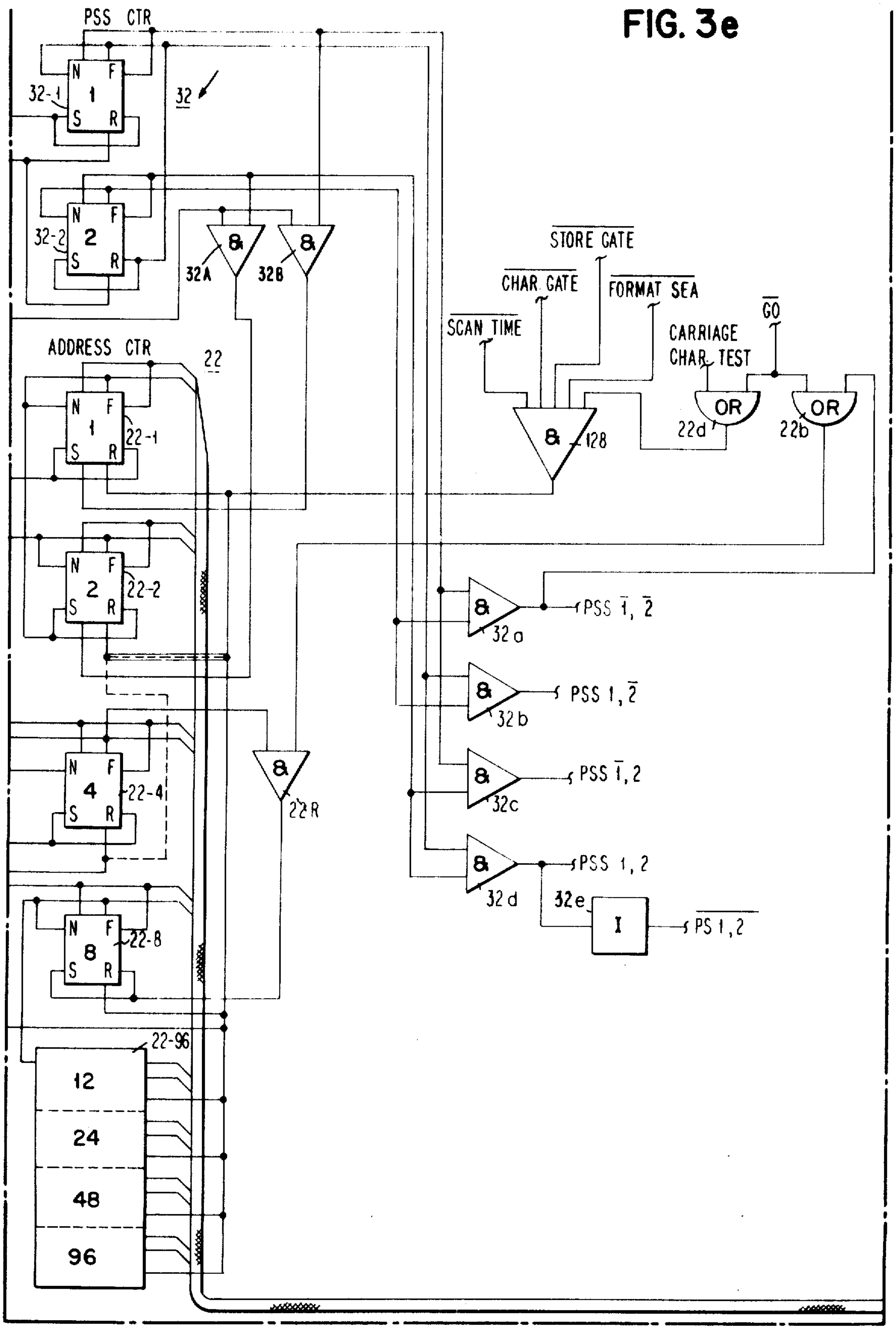
Figure 3F:
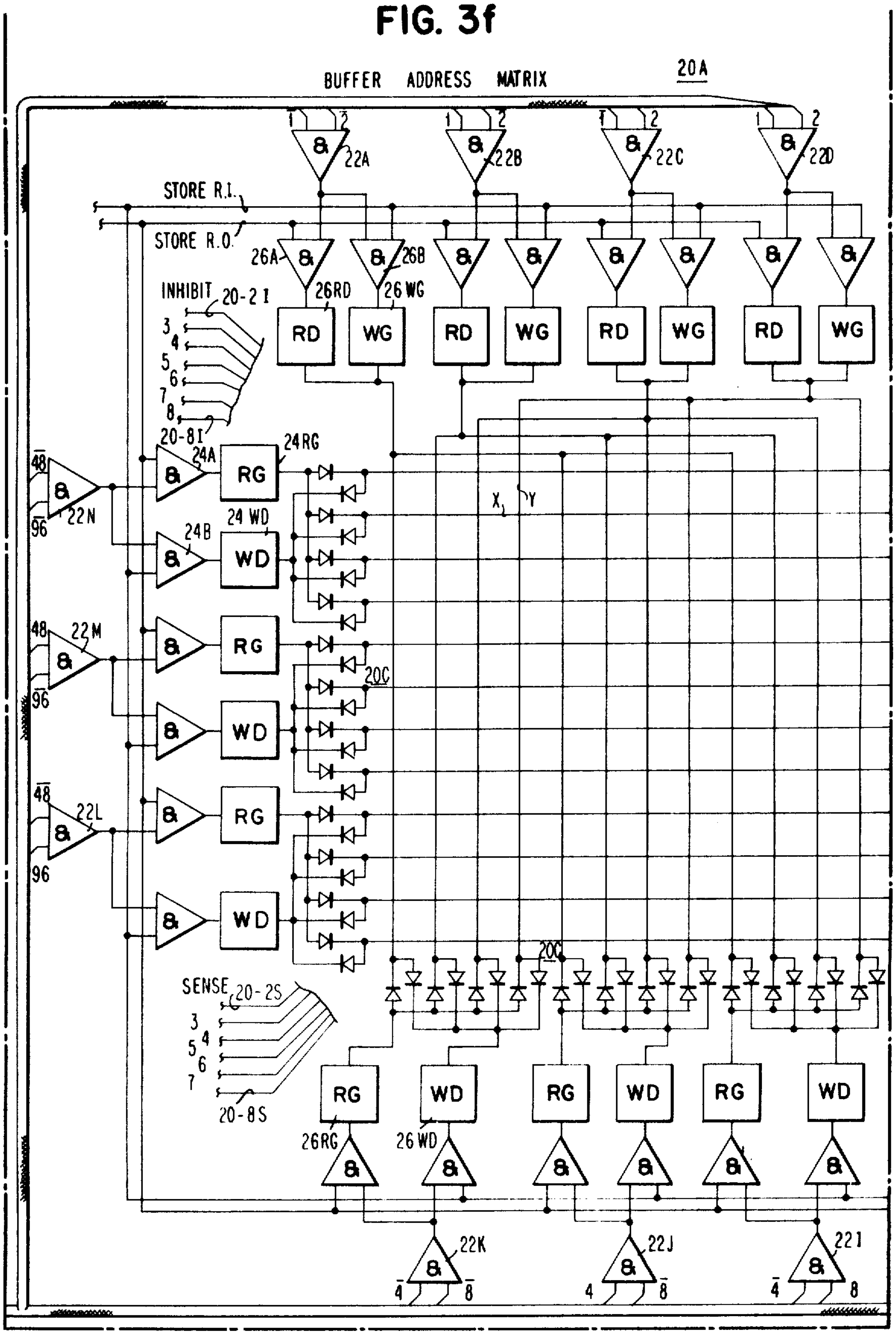
Figure 3G:
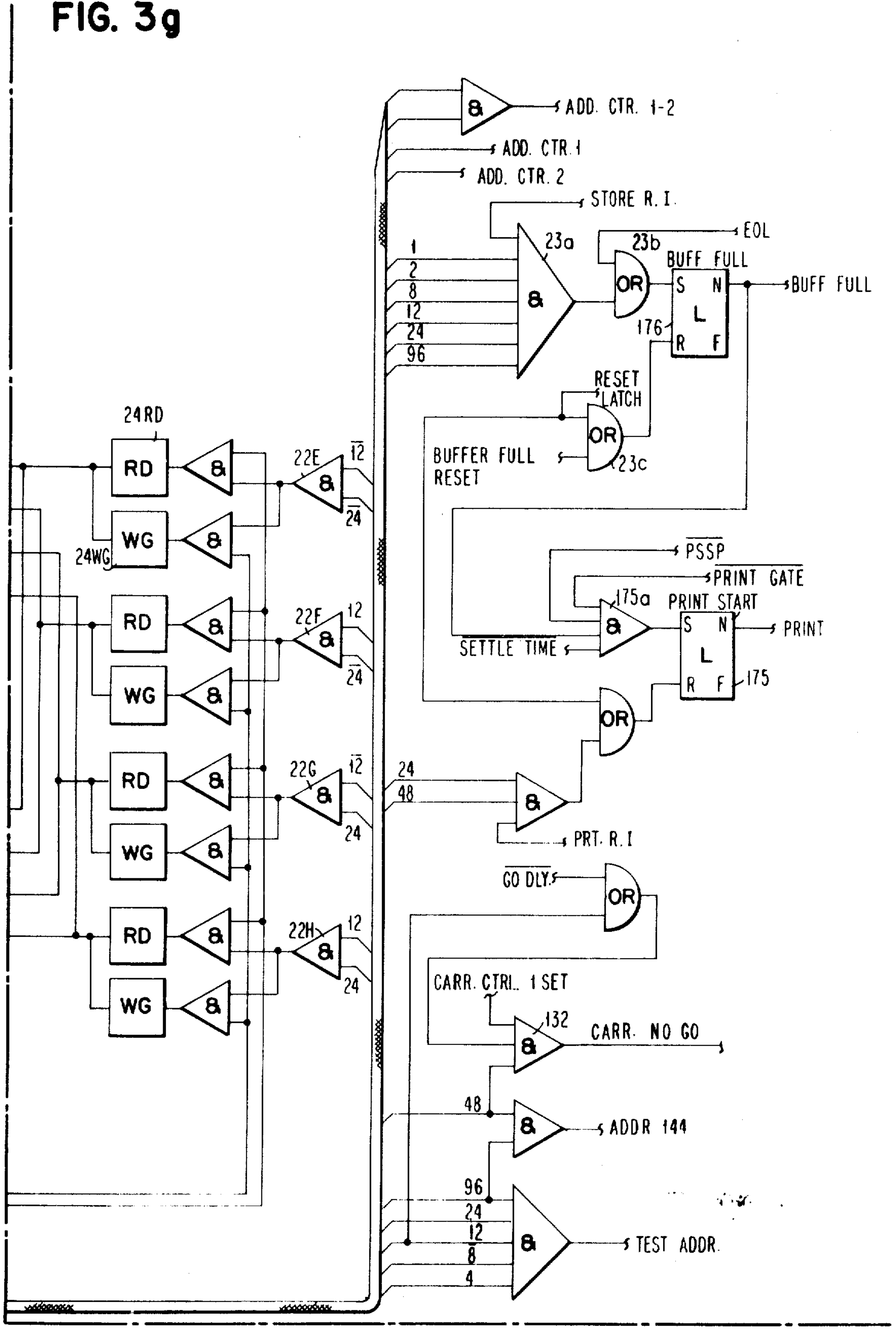
Figure 3H:
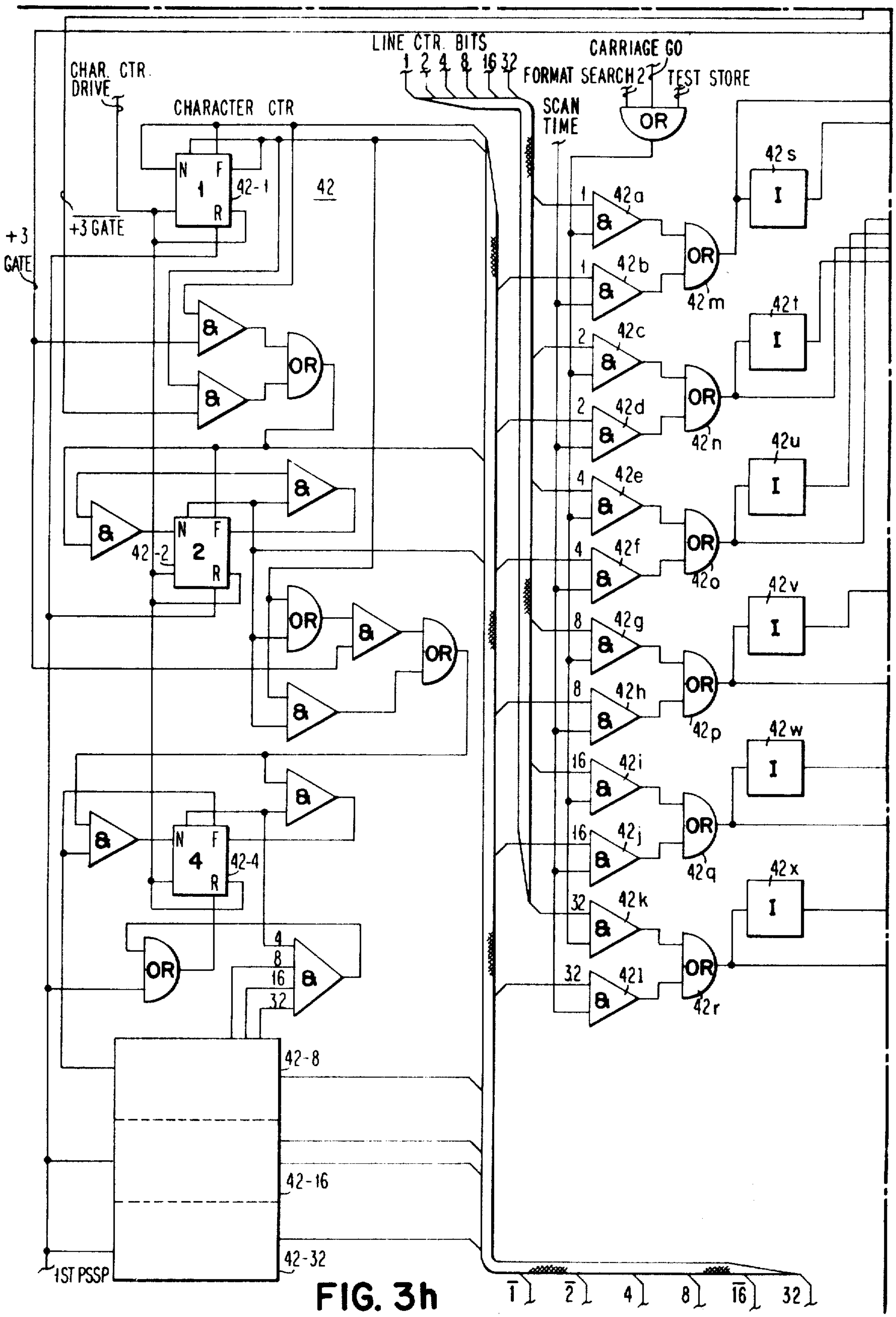
Figure 3I:
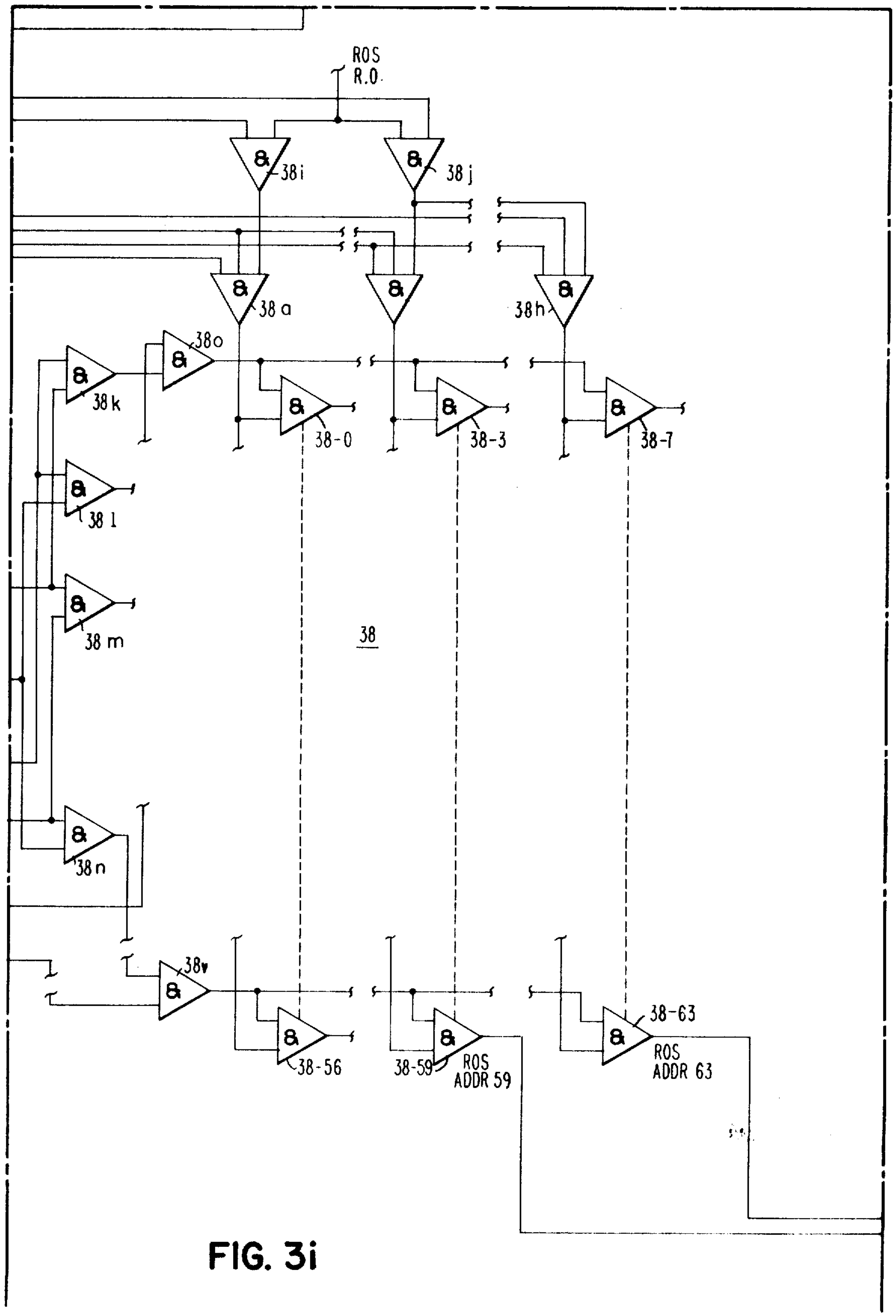
Figure 3J:
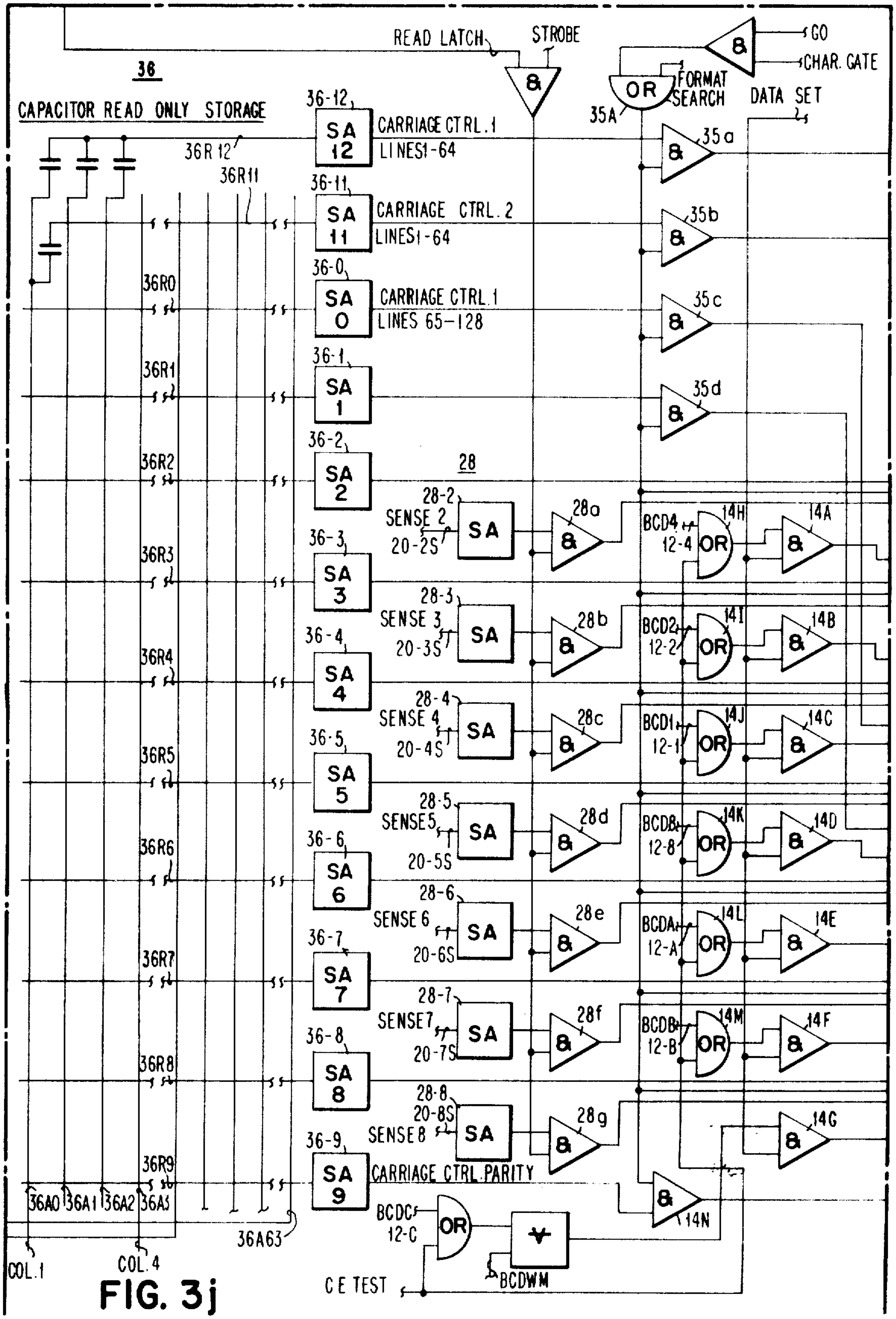
Figure 3K:
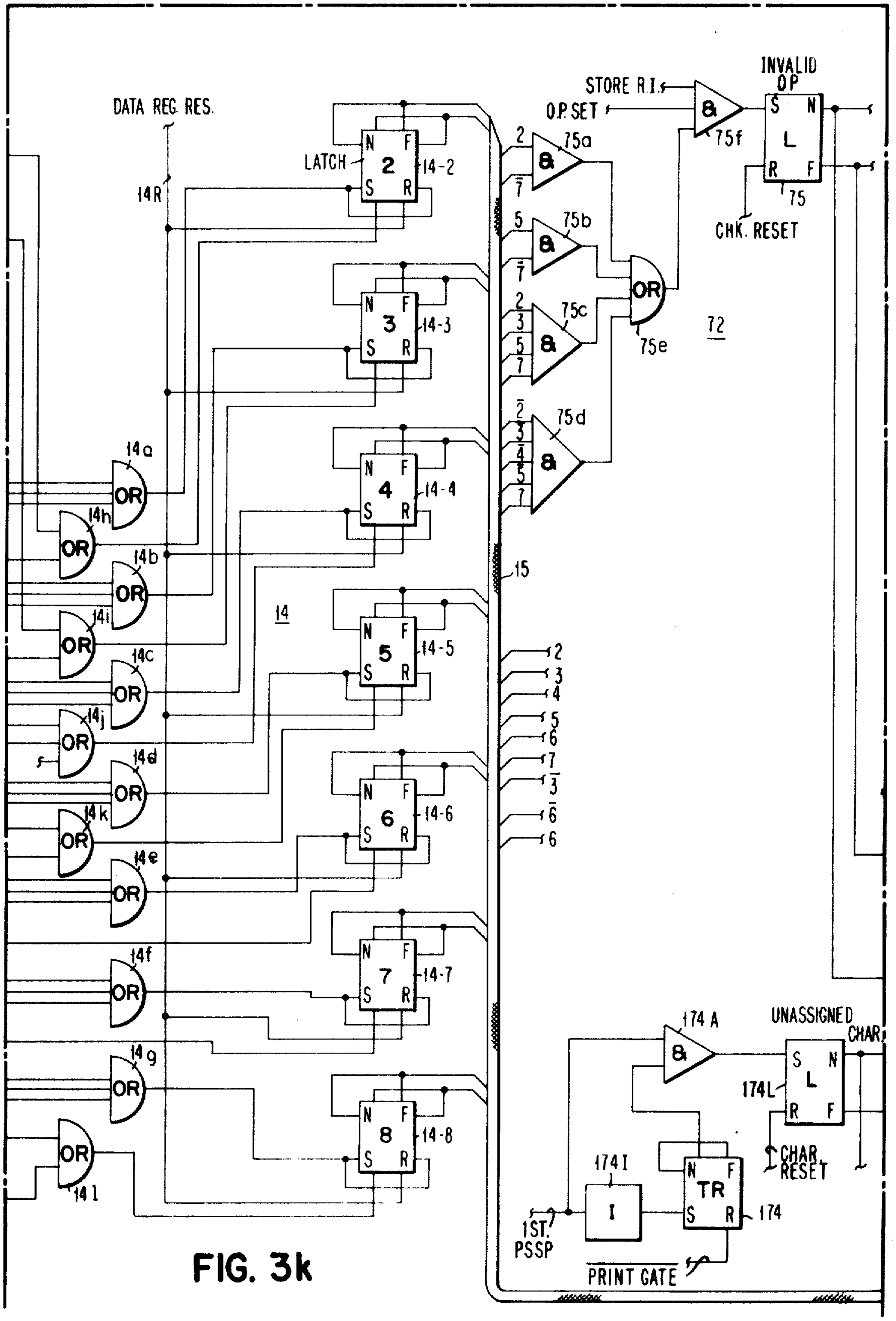
Figure 3M:
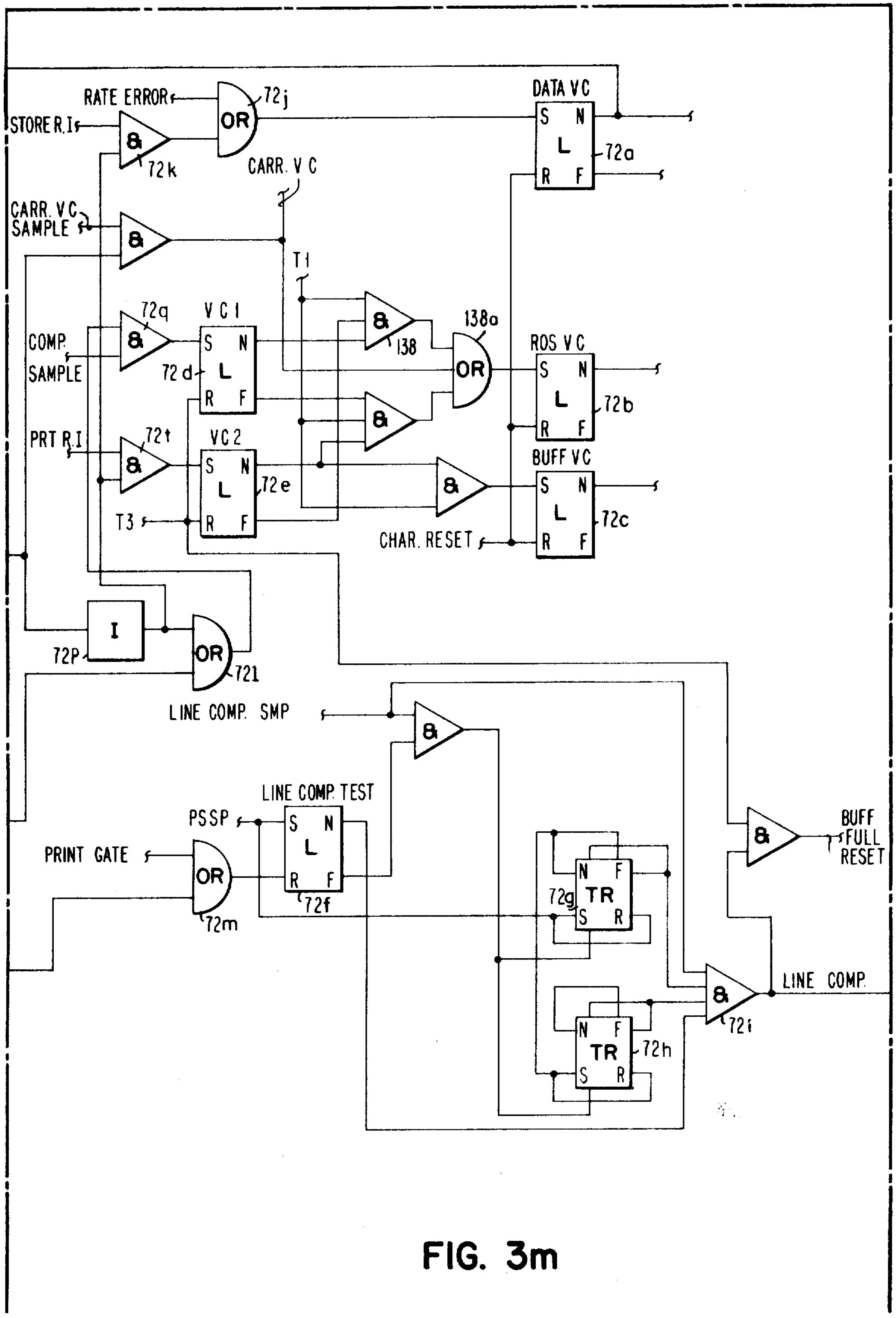
Figure 3N:
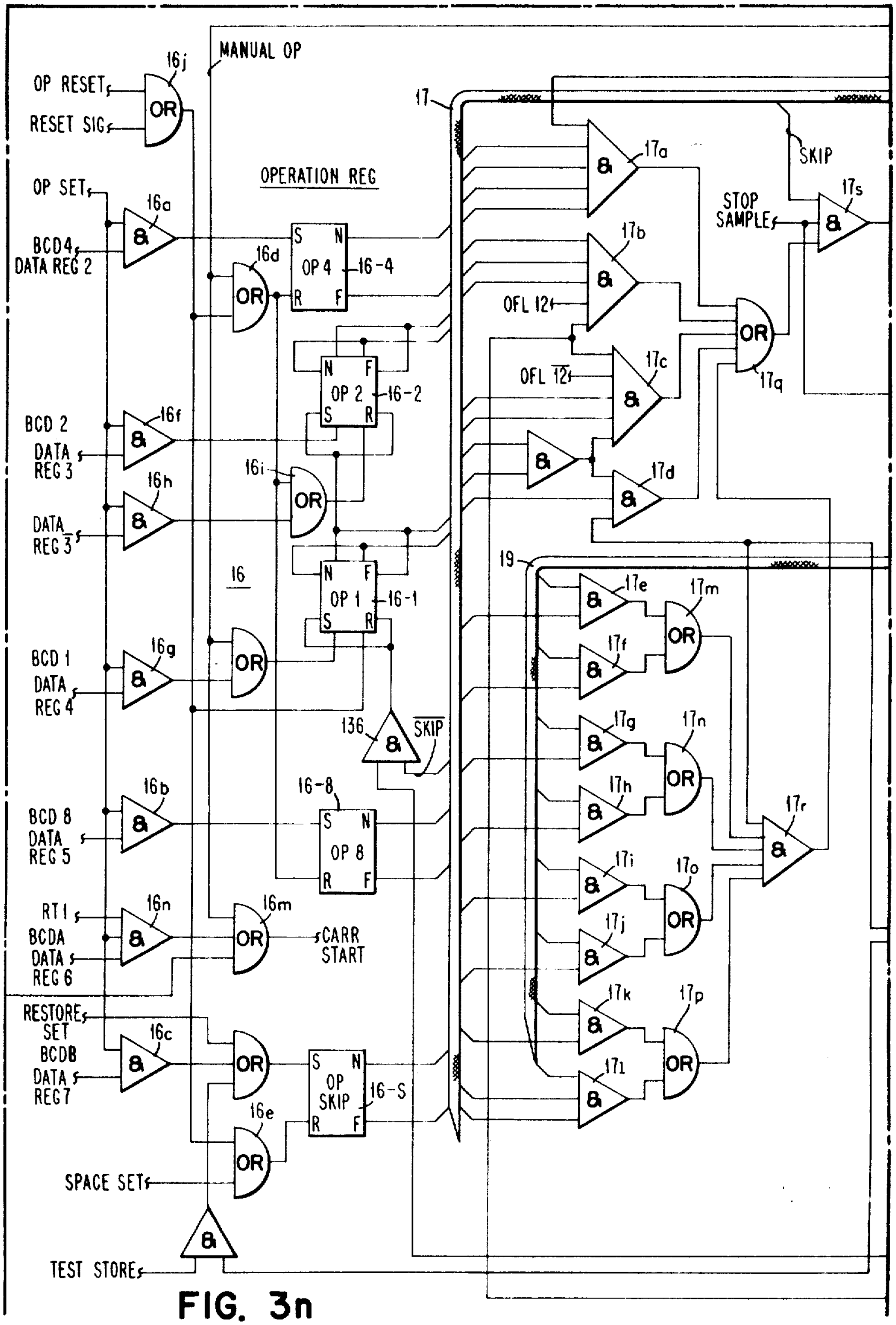
Figure 3O:
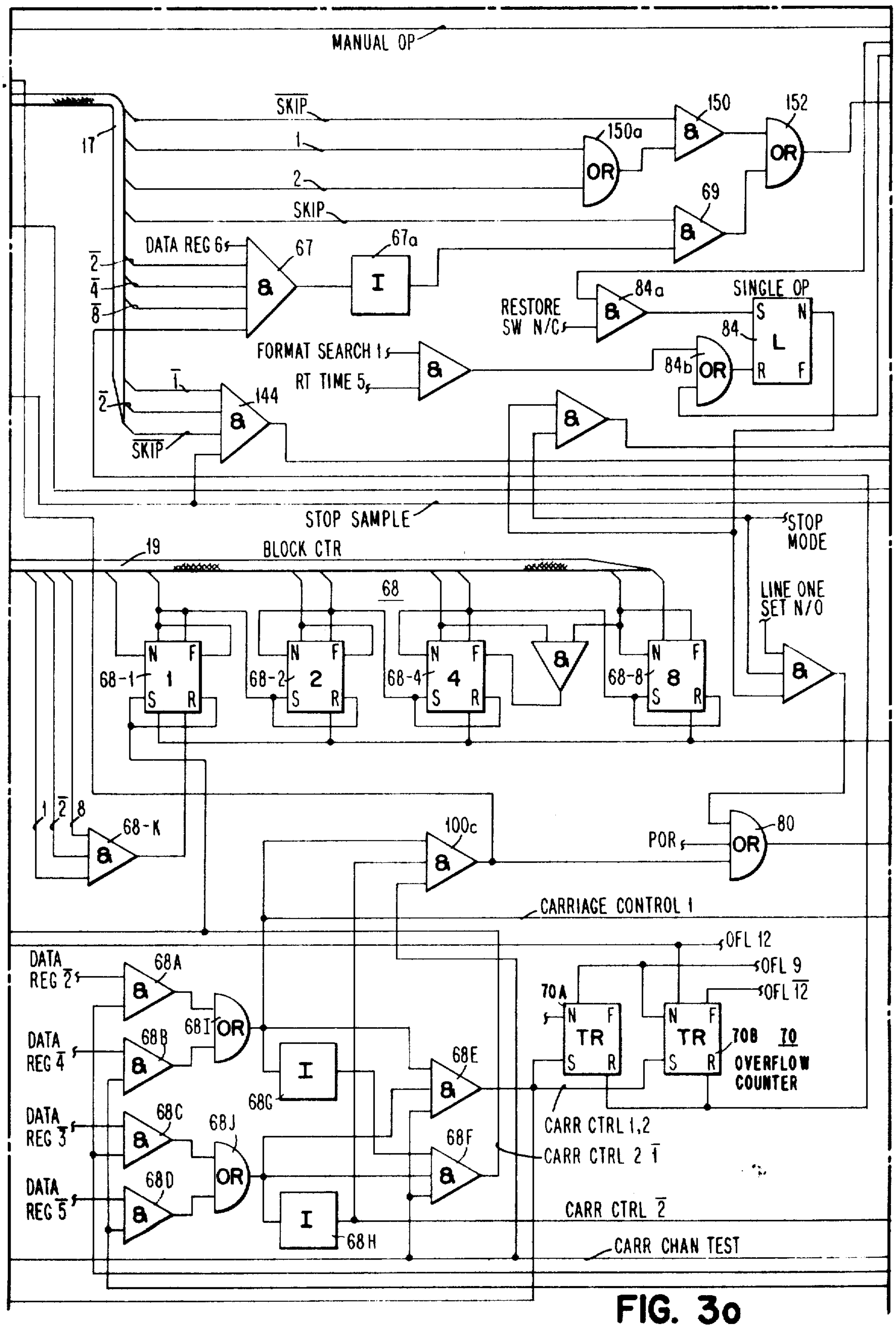
Figure 3P:
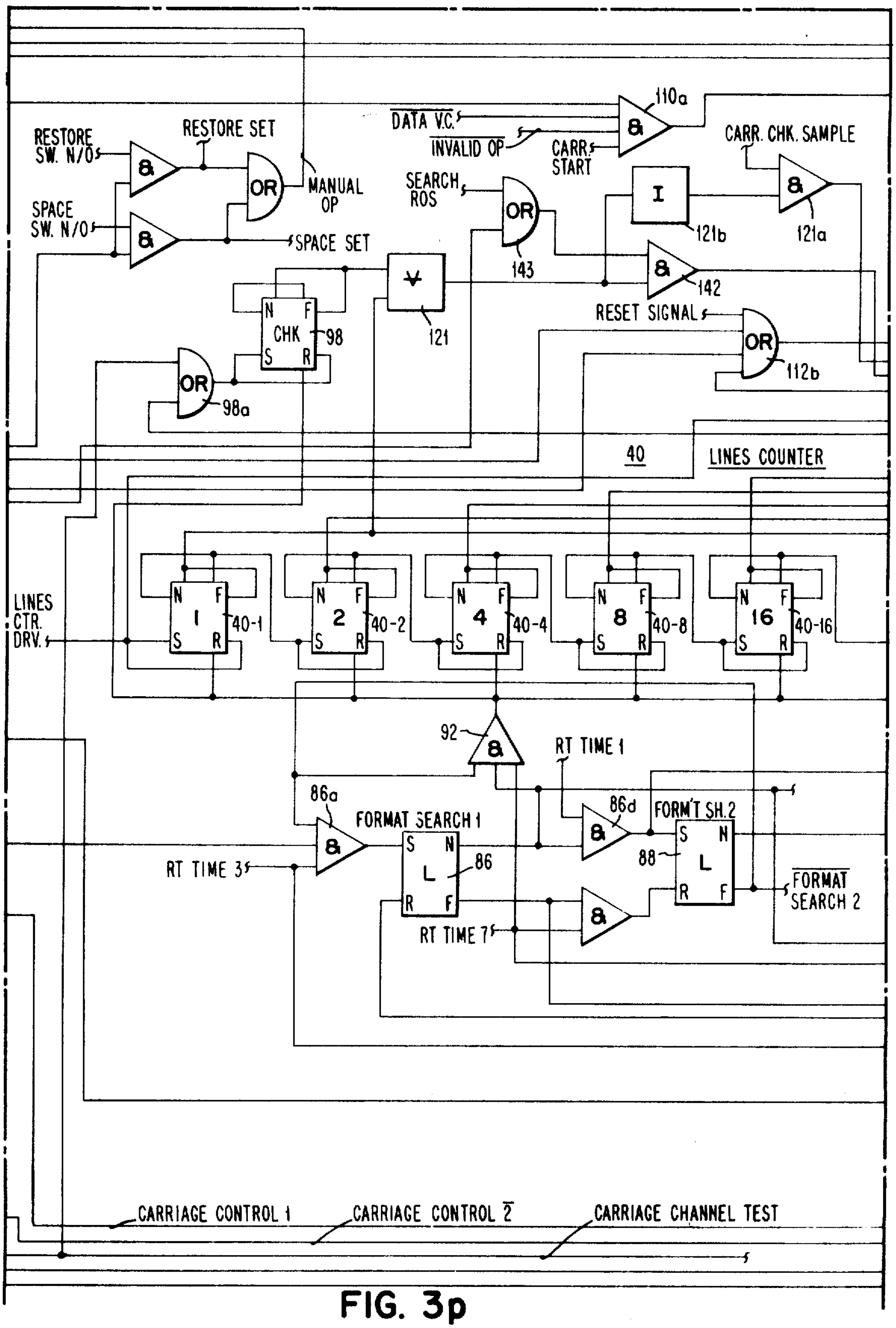
Figure 3Q:
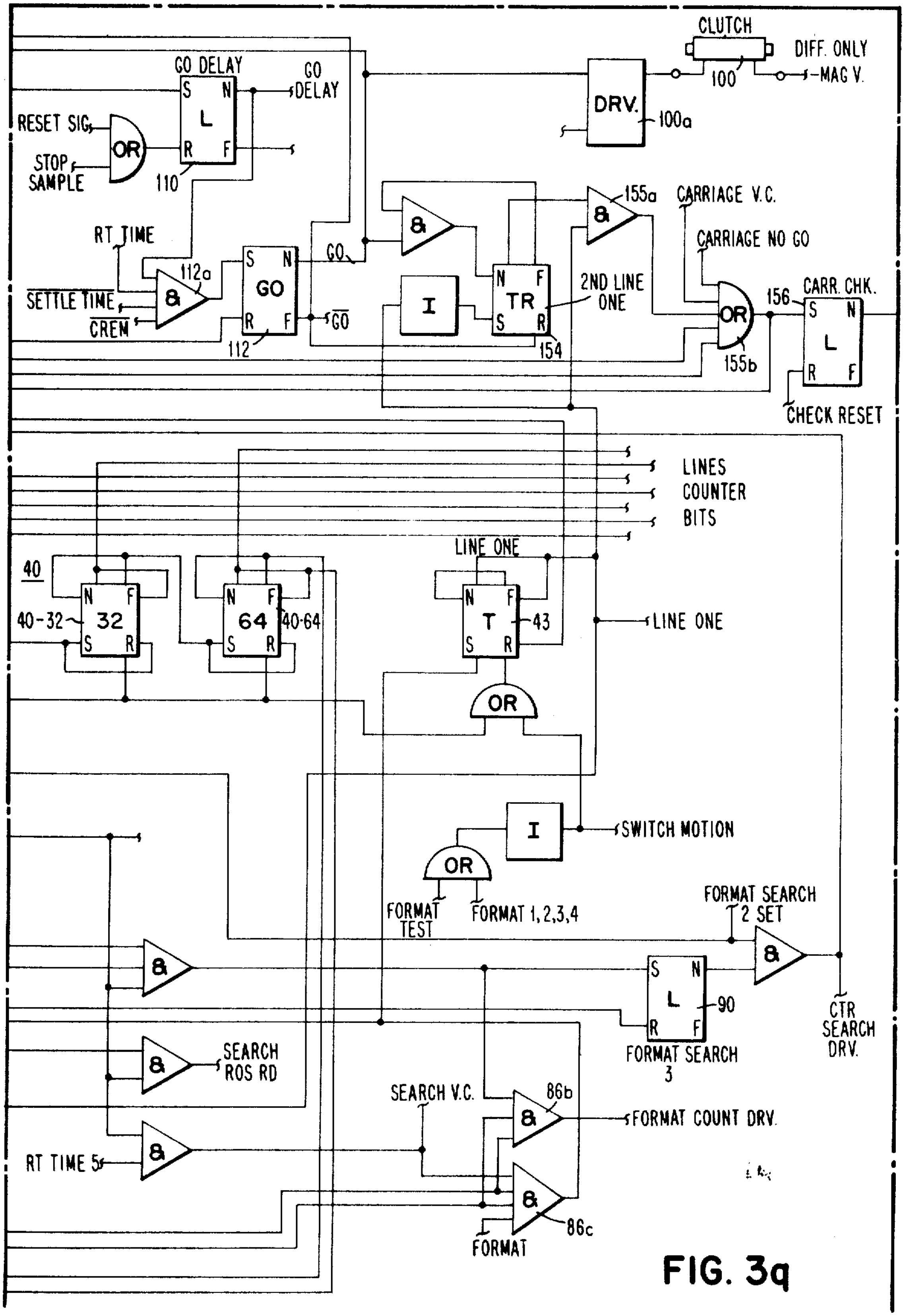
Figure 3R:
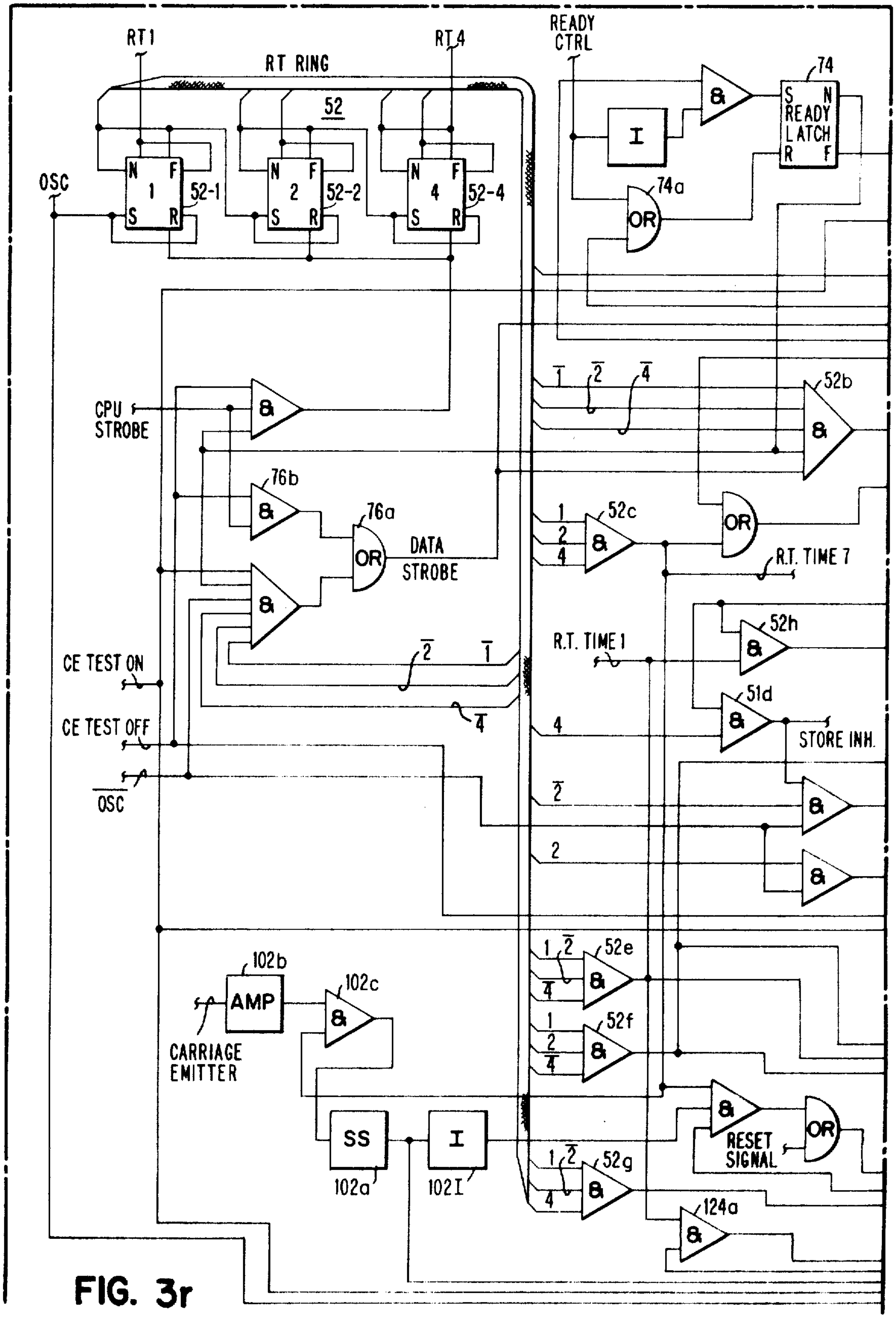
Figure 3S:
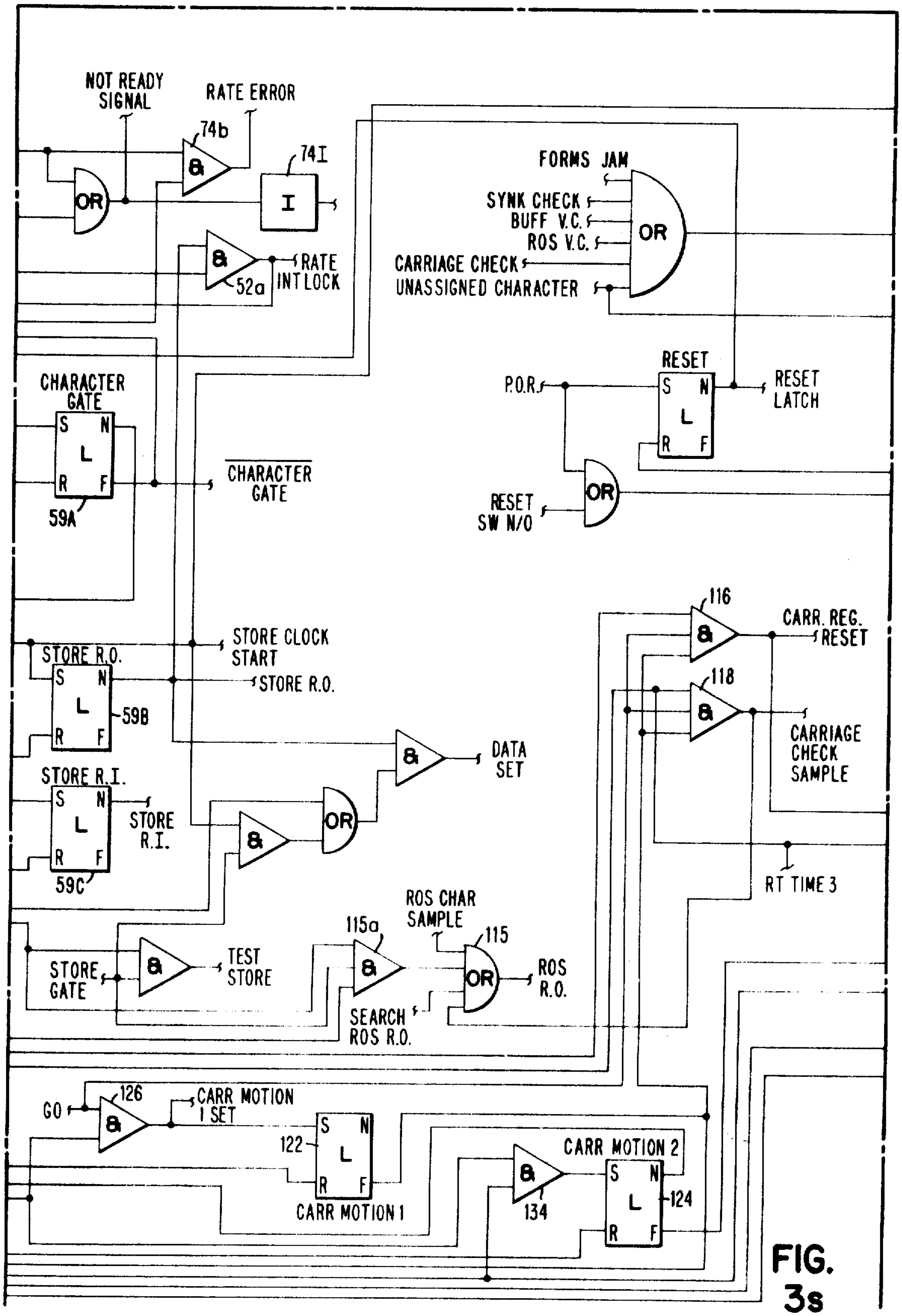
Figure 3T:
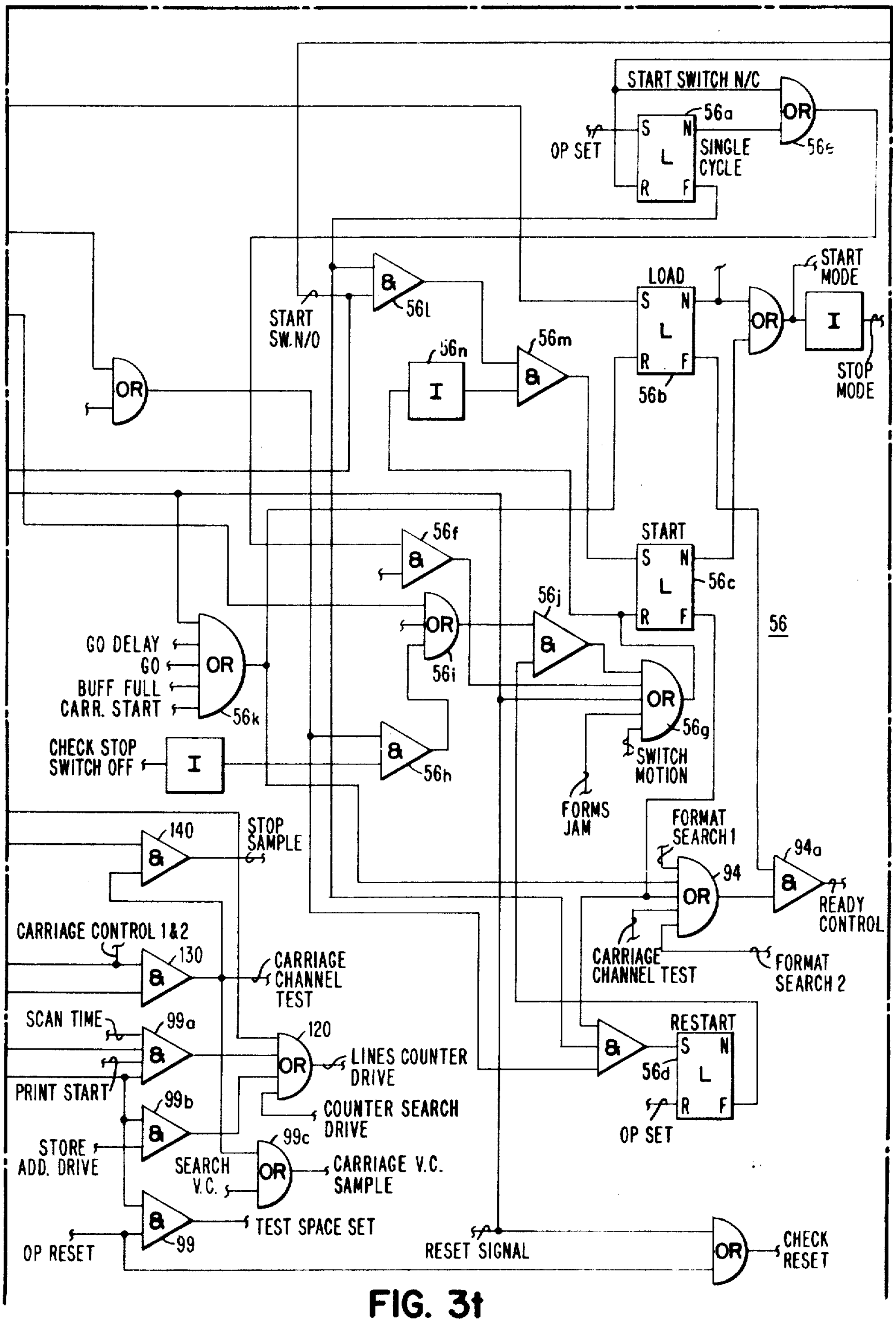
Figure 3U:
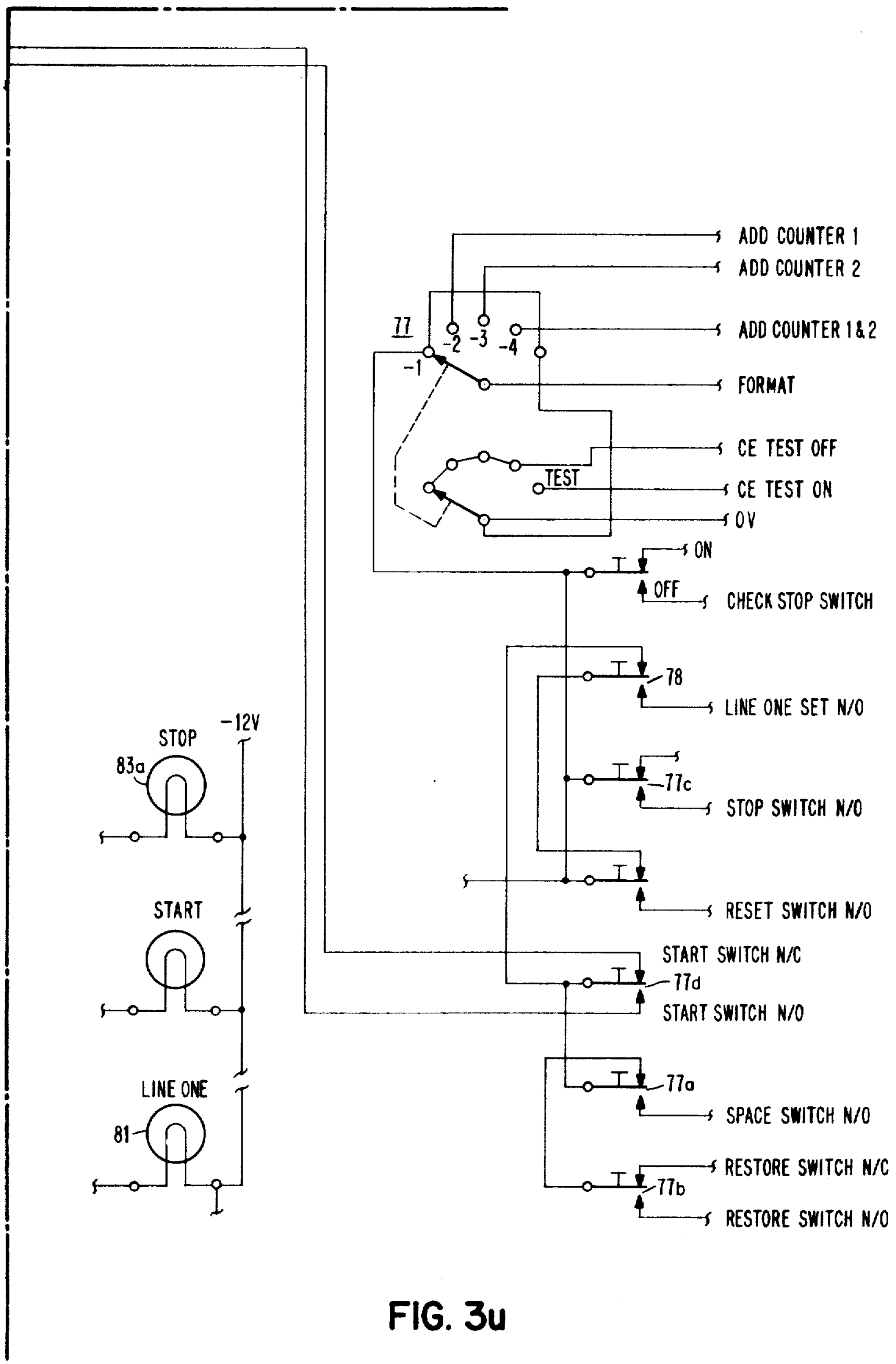
Figure 4:
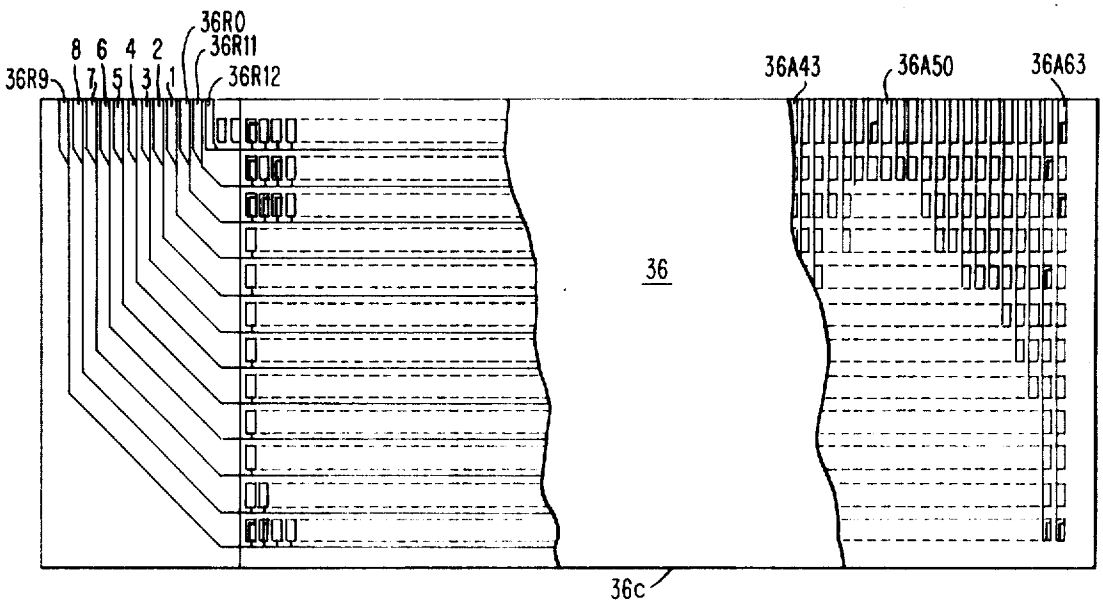

FIG. 4 is a partly broken away plan view of a read only storage card device of the type used in FIGS. 1 and 3.

FIG. 5 is a table of IMMEDIATE CARRIAGE OPERATION CODES.

FIG. 6 is a table of PRINT AND CARRIAGE CONTROL OPERATION CODES.

Figure 7:
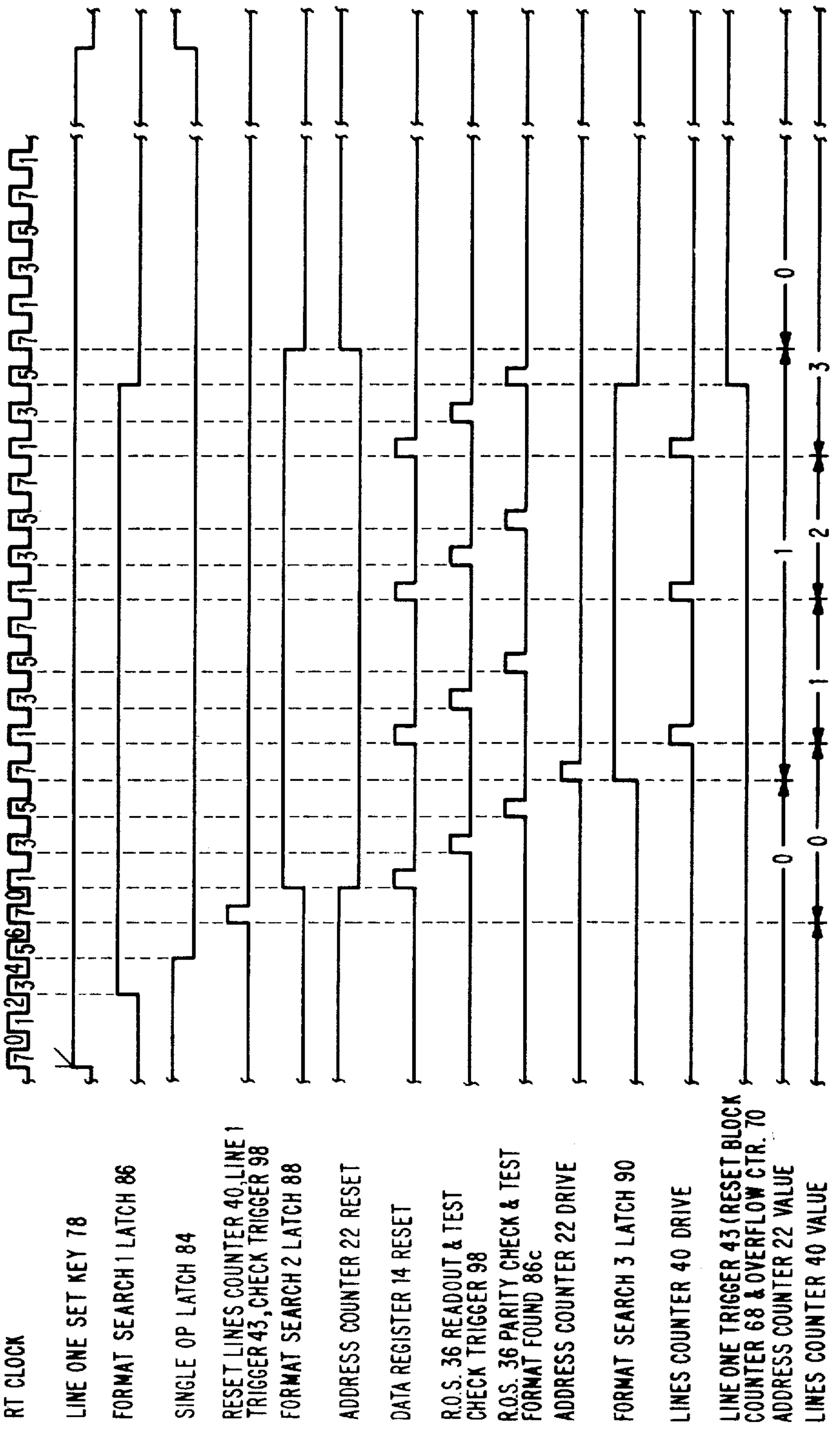

FIG. 7 is a chart which shows a plurality of timing curves illustrating a FORMAT SEARCH SEQUENCE.

Figure 8:
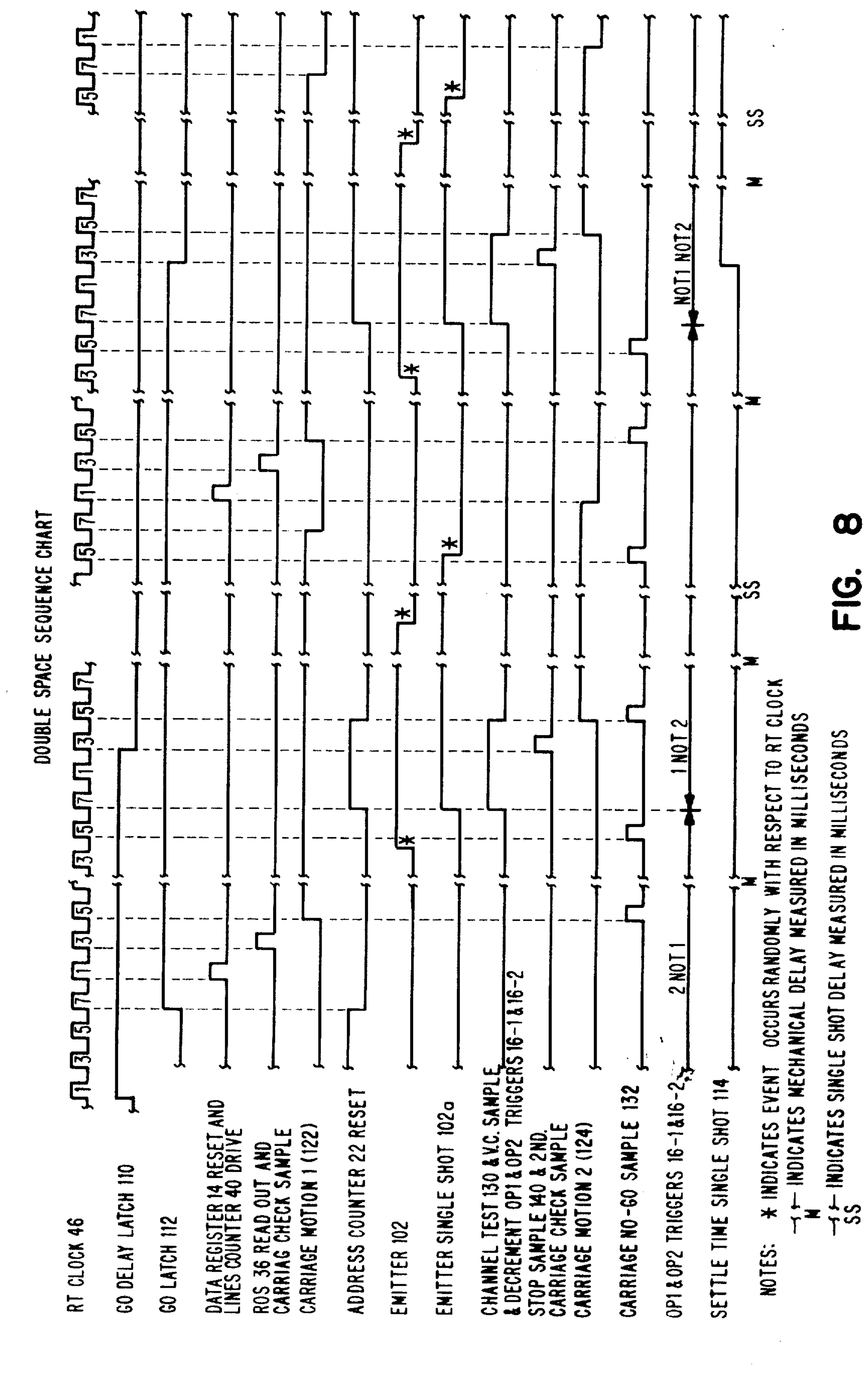

FIG. 8 is a chart showing a plurality of timing curves illustrating a double space sequence of operations.

Figures 9, 11:
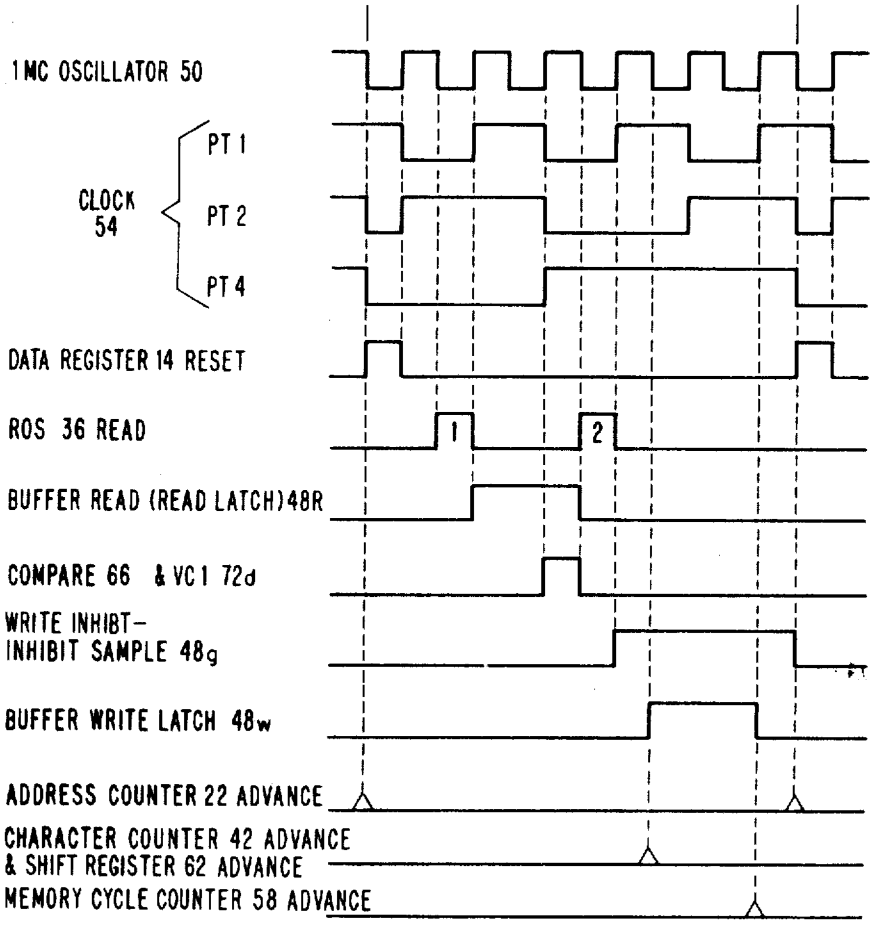

FIG. 9 is a table of READ ONLY STORAGE CARRIAGE CONTROL CODES.

FIG. 10 is a schematic diagram showing the relative spacings of the type and hammers in the printer used with the control system of FIG. 1.

Figure 12:
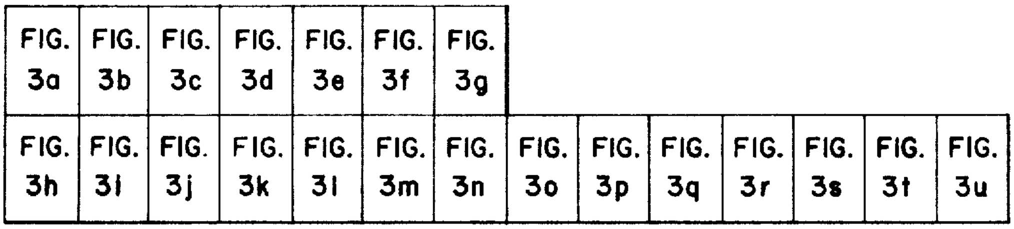

FIG. 11 is a chart which shows a plurality of timing curves illustrating a MEMORY CYCLE SEQUENCE OF OPERATIONS, and FIG. 12 is a diagram showing the arrangement of FIGS. *3a–3u*.

DESCRIPTION OF A PREFERRED EMBODIMENT

Referring to FIG. 1, the reference numeral 10 denotes generally a control system for a high-speed printer in which commands and data to be printed are transmitted over in BUS OUT LINES 12 from a computer (not shown) to a DATA REGISTER 14. From the REGISTER 14 commands are routed to an OPERATION or COMMAND REGISTER 16, and data is transmitted to a PRINT LINE BUFFER 20, which is provided with an ADDRESS COUNTER 22 controlling the usual X-DRIVERS 24 and Y-DRIVERS 26, and SENSE AMPLIFIERS 28, and INHIBIT DRIVERS 30. A PRINT SUBSCAN COUNTER 32, an OR 34, and PRINT SCAN and CARRIAGE DRIVE NO-GO CHECK SIGNAL LINES are connected to operate the ADDRESS COUNTER 22.

A READ ONLY STORAGE DEVICE 36 of the capacitor type is addressed by an ADDRESS MATRIX 38 for reading out both format carriage control signals and type chain character representations from different bit positions of the READ ONLY STORAGE DEVICE 36 into the DATA REGISTER 14 under the control of a LINE COUNTER 40 and a CHARACTER COUNTER 42. The LINE COUNTER 40 is reset by a Start Format Search Signal and is driven from an OR 44 by Format Search, Carriage Advance, Off-Line Test, and Off-Line Test Adjust Signals. The CHARACTER COUNTER 42 is reset by a first PSS Pulse after Home Pulse from the PSS COUNTER 32 and is driven from an OR 46 by Print Subscan Signals and the output from PRINT SCAN and SEQUENCE CONTROLS 48. An OSCILLATOR 50 driving a READ TIME RING 52 and a PRINT CLOCK 54 provide timing for BUFFER STORE and CARRIAGE SEQUENCE CONTROLS 56. A MEMORY CYCLE COUNTER 58 driven by the CLOCK 54 provides timing for the PRINT SCAN SEQUENCE CONTROLS 48 and a TIMING DECODE CIRCUIT 60, which with a SHIFT REGISTER 62, controls selection of hammers by a PRINT HAMMER MATRIX 64. The SHIFT REGISTER 62 is controlled by a COMPARE CIRCUIT 66 connected to the DATA REGISTER 14. A BLOCK COUNTER 68 is used to count channels and skipping control operations, while an OVERFLOW COUNTER 70 determines when the end of a document is being approached or has been reached. CHECK CIRCUITRY 72 determines the validity of incoming data and data read from the READ ONLY STORAGE 36 and from BUFFER STORAGE 20.

Referring to FIGS. *3a–3u*, it will be seen that the DATA REGISTER 14 (FIG. *3k*) comprises a plurality of BIT LATCHES 14–2 through 14–8 connected to OUTPUT LINES 15 and arranged to be set or reset by AC pulses, through ORs 14*a–g* and set by a DC signal through ORs 14*h–l*, ANDs 14A–G (FIG. 3*j*), ORs 14H–M, and AND 14N. DC reset is accomplished over a DATA REGISTER RESET LINE 14R from OR 48*f* (FIG. 3*b*) and AND 48*j*.

The OPERATION or COMMAND REGISTER 16 (FIG. 3*n*) comprises a five-stage register including LATCHES 16–4, 16–8, and a SKIP LATCH 16–S. These latches are arranged to be set through ANDs 16*a–c* and are reset through ORs 16*d–e*. TRIGGERS 16–2 and 16–1, which are set by DC signals through ANDs 16*f–g* and reset through AND 16*h* and OR 16*i*, and reset OR 16*j*, respectively, comprise two stages of this five-stage register. The outputs of these latches and triggers are connected to a CABLE 17 from which connections are made to different portions of the control circuitry including, amongst others, a plurality DECODE ANDs 17*a–d*, COMPARE ANDs 17*e–l*, ORs 17*m–q*, and ANDs 17*r* and 17*s*.

The PRINT LINE BUFFER 20 itself is not shown in detail since this is a well-known type of core storage buffer. The ADDRESS MATRIX 20A for the print line buffer is shown in FIGS. 3*f*–3*g* and comprises a plurality of X-Drive lines connected to X-READ DRIVERS 24RD and X-WRITE DRIVERS 24WD through DIODES 20C and connected to associated READ GATES and WRITE GATES 24RG and 24WG, respectively. The Y-Drive Lines are likewise connected to Y-READ and -WRITE DRIVERS 26RD and 26WD, respectively, as well as the associated READ and WRITE GATES 26RG and 26WG.

Figure 31:
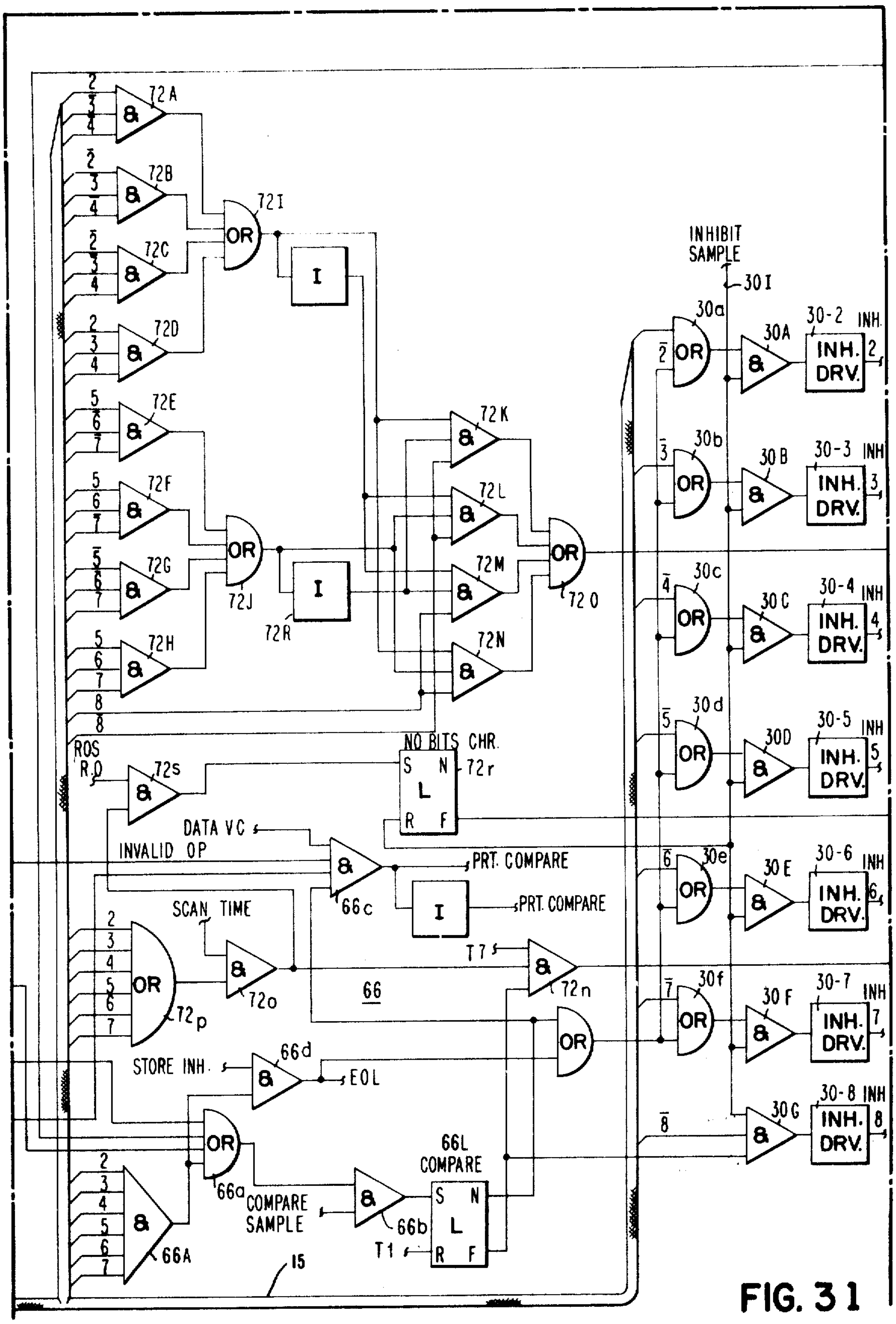

The ADDRESS COUNTER 22, also shown in FIG. 3*e*, comprises a plurality of TRIGGERS 22-1, 22-2, 22–4, 22–8, 22-12, 22-24, 22–48, and 22–96, arranged in a modified binary counting arrangement and connected to the X and Y Drivers and Gates through DECODE ANDs 22A–N and AND GATES 24A–B and 26A–B. AND 481 (FIG. 3*b*) provides a drive for the ADDRESS COUNTER 22 through OR 22*f* (FIG. 3*d*) during a print scan. During loading the BUFFER 20 the drive is through OR 22*e* by a Store Address Drive Signal from AND 57*c* (FIG. 3*a*). Two conditions can stop the loading operation. A BUFFER FULL LATCH 176 (FIG. 3*g*) may be turned on by the last ADDRESS POSITION 143 through AND 23*a* and OR 23*b*, or an End-of-Line Signal from AND 66*d* (FIG. 31). Reset is through OR 23*c*. The SENSE AMPLIFIERS 28 are shown in FIG. 3*j* comprising a plurality of AMPLIFIERS 28-2 through 28–8 connected to the DATA REGISTER 14 through ANDs 28*a–g*. The SENSE AMPLIFIERS 28–2 through 28–8 are connected to the associated SENSE LINES 20–2S through 20–8S of the BUFFER ADDRESS MATRIX 20A (FIG. 3*f*). INHIBIT DRIVERS 30–2 through 30–8 shown in FIG. 3*l* are connected to the DATA REGISTER CABLE 15 through ORs 30*a–f* and ANDs 30A–30G. The INHIBIT DRIVERS 30–2 through 30–8 are connected to the INHIBIT LINES 20–2I through 20–8I of the BUFFER ADDRESS MATRIX 20A (FIG. 3*f*). An Inhibit Sample Signal is applied over LINE 30I from OR 48*g* (FIG. 3*b*) in conjunction with AND 48*h* and OR 48*i* to inhibit writing into BUFFER 20 when loading or during Print Scan.

The PRINT SUBSCAN COUNTER 32 (FIG. 3*e*) comprises a pair of TRIGGERS 32-1 and 32-2, which are connected, respectively, through PICKUP DEVICES 32C–D (FIG. 3*b*), SINGLE SHOT 32E, 32E*l*, and TRIGGER 32F to be driven by Print Subscan Pulses from EMITTER 32A and reset under control of Home Pulses from EMITTER 32B. These emitters are driven by the type chain of the printer for providing information as to the instantaneous location of the type chain. The COUNTER 32 is connected through ANDs 32A, 32B so as to keep TRIGGERS 22-1, 22–2 in step with the PSS Counter during Print Scan time.

The READ ONLY STORAGE DEVICE 36, which is shown schematically in FIG. 3*j* as comprising a plurality of VERTICAL ADDRESS LINES 36A0 through 36A63 and a plurality of HORIZONTAL READOUT LINES 36R12, 36R11, and 36R0 through 36R9, connected to SENSE AMPLIFIERS 36–12, 36–11, 36–0, and 36–1 through 36–9, may be of the capacitor type, such as, by way of example, described in U.S. Pat. No. 3,251,043, which issued on May 10, 1966, to J. W. Haskell, entitled "Record Card Memories." Physically, the READ ONLY STORAGE DEVICE 36 may comprise, as shown in FIG. 4, a CARD 36*c* of plastic dielectric material having a printed circuit pattern on each side comprising the plurality of HORIZONTAL READOUT LINES 36R12, 36R11, 36R0, and 36R1 through 36R9 on one side, and VERTICAL ADDRESS LINES 36A0 – 36A63, represented by the LINES 36A43 – 63, on the other side connected to rectangular printed circuit sections at each of the possible bit locations on each side of the card. Bit storage is effected by punching out the rectangular printed circuit sections at selected locations where it is desired to store a bit of information. Readout is effected by energizing the ADDRESS LINES 36A0 - 36A63 on the one side of the CARD 36*c* with a pulse, and detecting the absence or presence of a capacitive pulse on different ones of the READOUT LINES 36R12 - 36R9 on the other side of the card, depending on whether the rectangular printed circuit sections remain or have been removed by punching to store a bit of information. Carriage control data is stored in the 36–12, 36–11, 36–0, and 36–1 bit positions. The 36–12 and 36–0 positions are used to provide a carriage control code 1 Signal, while the 36–11 and 36–1 positions provide a carriage control 2 Signal. Coded representations of characters on the printer chain or belt are stored in the 36–2 through 36–8 bit positions. Bit position 36–9 is used for a parity check for the carriage control data. ANDs 35*a–d* gate the carriage control bits to the DATA REGISTER 14 at the DC set inputs. Since the format search 1 signal or GO from OR 35A is directed to the AC set of all the register triggers, any readout from ROS bit positions 2–8 is blocked when the ANDs 35*a–d* are gated from 35A.

The ADDRESS MATRIX 38 (FIG. 3*i*) for the READ ONLY STORAGE DEVICE 36 comprises a matrix of ANDs 38–0 through 38–63, which are connected to the corresponding ADDRESS LINES 36–0 through 36–63 of the READ ONLY STORAGE DEVICE 36 (FIG. 3*j*). The ANDs 38–0 through 38–63 are connected by means of DECODE ANDs 38*a–v* from either the CHARACTER COUNTER 42 (FIG. 3*h*) or the LINES COUNTER 40 (FIG. 3*p*) depending on the operation in progress. The CHARACTER COUNTER 42 (FIG. 3*h*) comprises a plurality of TRIGGERS 42-1, 42-2, 42–4, 42–8, 42-16, and 42-32, connected along with bit lines from the LINES COUNTER 40 to the DECODE ANDs 38*a–v* through ANDs 42*a–l* and ORs 42*m–r* in conjunction with INVERTERS 42*s–x*. A character counter drive signal from OR 48*o* (FIG. 3*b*) provides a drive for the CHARACTER COUNTER 42.

The LINES COUNTER 40 (FIG. 3*p*–3*q*) comprises a plurality of TRIGGERS 40–1, 40–2, 40–4, 40–8, 40–16, 40–32, and 40–64, connected as a binary counter. A LINE ONE TRIGGER 43 is provided in conjunction with the LINES COUNTER 40.

The PRINT SCAN and SEQUENCE CONTROLS 48 of FIG. 1 are shown generally in FIG. 3*b*, and comprise a READ LATCH 48R connected to be set through AND 48*a* from CLOCK DECODE AND 55*b* (FIG. 3*a*), and the ON output of a PRINT GATE LATCH 48*b* (FIG. 3*a*) through AND 48*c* (FIG. 3*b*), which produces a Scan Time Signal, and a WRITE LATCH 48W, which is set through AND 48*d* and reset through AND 48*e*, together with associated logic circuitry. OR 48*k* provides a storage Read In Signal in response to operation of the WRITE LATCH 48W or a STORE RI LATCH 59C (FIG. 3*s*). STORE GATE LATCH 57A (FIG. 3*a*), CHARACTER GATE LATCH 59A (FIG. 3*s*), and STORE READ IN LATCH 59C operate in sequence in loading characters in the BUFFER 20 in response to a Data Strobe Signal from AND 52*b* and OR 76*a* (FIG. 3*r*). STORE READOUT LATCH 59B controls the sequencing of latch 57A. OR 48 *m* (FIG. 3*b*) provides a storage readout signal to the BUFFER ADDRESS MATRIX 20A (FIGS. 3*f–g*) corresponding to the Storage Read In from OR 48*k*.

Timing is provided by the OSCILLATOR 50 (FIG. 3a), which drives the READ TIME RING 52 (FIG. 3r) comprising TRIGGERS 52–1 and 52–2, and 52–4 as well as the PRINT CLOCK 54, which comprises three TRIGGERS 54–1, 54–2, and 54–4, connected to the 1-megacycle OSCILLATOR 50 and provided with an AND 54a and an OR 54b connected in conjunction with an INVERTER 54c so as to reset TRIGGER 54–2 and modify the operation of the counter to count six Oscillator Pulses instead of the usual BINARY 8 as shown at the top of FIG. 11. A Clock Decode Circuit comprises ANDs 55a–c connected to provided Timing Pulses T1, T3, and T7.

BUFFER STORE and CARRIAGE SEQUENCE CONTROLS 56 include SINGLE CYCLE, LOAD, START, and RESTART LATCHES 56a–d (FIG. 3t).

The SINGLE CYCLE LATCH 56a provides means for the operator to cause the machine to accept one command only by holding the STOP KEY 77c and the START KEY 77d closed. Since LATCH 56a provides a reset for the START LATCH 56c through OR 56e, AND 56f, and OR 56g, and the normally closed contacts of the START KEY 77d turn the LATCH 56a off, the operator has to release the START KEY 77d before another start can be made. AND 56h, OR 56i, and AND 56j provide other inputs to OR 56g.

The LOAD LATCH 56b operates to produce a Load Signal when loading the BUFFER 20 in response to a Load Clock Start Signal from AND 52h (FIG. 3r) and is reset by OR 56k. The Load Signal is utilized in conjunction with the output of an OPERATION NOT IMMEDIATE LATCH 57 and a STORE GATE LATCH 57A through ANDs 57a, 57b, and 57c (FIG. 3a) to reset the DATA REGISTER 16 (FIG. 3k), set the OPERATION or COMMAND REGISTER 16 (FIG. 3n), and drive the ADDRESS COUNTER 22 (FIG. 3e) during store operations.

The START LATCH 56c turned on through AND 56l, AND 56m, and INVERTER 56n determines through the five-way OR 56g if there are any conditions which preclude starting operations when the START KEY 77d is operated.

The RESTART LATCH 56d prevents starting a subsequent operation until the START LATCH 56c is first turned off.

Referring to FIGS. 3c and 3d, it will be seen that the SHIFT REGISTER 62 comprises 18 TRIGGERS 62–1 through 62–18, which are connected to PRINT COMPARE AND 66c (FIG. 31) and to a REGISTER DRIVE CIRCUIT 62D for progressively storing up to 18 Print Compare Signals during Print Scan, and through ANDs 64a–r and DRIVERS 64ad–rd (FIG. 3d) to effect energization of selected PRINT HAMMER OPERATING WINDINGS H1 through H144. Operation of the SHIFT REGISTER 62 is controlled by ANDs 62H and 62I, which provide for operating a SHIFT REGISTER CHECK TRIGGER 62E in conjunction with OR 62M and resetting the SHIFT REGISTER to 1 initially through AND 62N. ANDs 62F and 62G function with the TRIGGER 62E through INVERTERS 62K and 62L to insure that the bit in TRIGGER 62–1 reaches TRIGGER 62–18 on the correct count. Each hammer winding is provided with an associated INHIBIT WINDING I1 through I144, which are connected through INHIBIT DRIVERS 64–I1 through 64–I8 and ANDs 64A–1–8, to the TIMING DECODE CIRCUIT 60 (FIG. 3d), which comprises a plurality of DECODE ANDs 60A–G with associated ORs 60H and I.

The COMPARE CIRCUIT 66 (FIG. 31) comprises an AND 66A connected to the DATA REGISTER OUTPUT LINES 15, and connected to a COMPARE LATCH 66L through OR 66a and AND 66b, in conjunction with a Compare Sample Signal from AND 48n (FIG. 3b).

The BLOCK COUNTER 68 (FIG. 3o) comprises a plurality of TRIGGERS 68–1, 68–2, 68–4, and 68–8, connected for comparing their count with that of the Skip Command in the OPERATION REGISTER 16 (FIG. 3n) through CABLE 19 to ANDs 17e–l and connected in conjunction with the OVERFLOW COUNTER 70, which comprises TRIGGERS 70A and 70B, to the DATA REGISTER 14 through OPERATION DECODE ANDs 68A–F, ORs 68I–J, INVERTERS 68G–H, and CABLE 15. DECODE AND 68K provides for skipping from a count of eight to 10, since Channel 9 is used as an overflow indication rather than a normal Skip Channel.

The CHECK CIRCUITRY 72 (FIGS. 3k–3l) comprises generally a plurality of DECODE ANDs 72A–H, ORs 72I–J, ANDs 72K–N, OR 72O, and INVERTERS 72P–R in conjunction with a DATA VALIDITY CHECK LATCH 72a, a ROS VALIDITY CHECK LATCH 72b, and a BUFFER VALIDITY CHECK LATCH 72c, VALIDITY CHECK 1 and VALIDITY CHECK 2 LATCHES 72d–e. VALIDITY CHECK 1 LATCH 72d is set through AND 72q, OR 72l, from LATCH 72r, which is set by AND 72s and reset by Inhibit Sample Signal from OR 48g (FIG. 3b). LATCH 72e is set through AND 72t and reset by T3 Signal from AND 55b (FIG. 3a). A LINE COMPLETE TEST LATCH 72f in conjunction with TRIGGERS 72g and 72h, provides Line Complete Signal at AND 72i. Reset of LATCH 72f is effected through OR 72m, AND 72n, AND 72o, and OR 72 p. SYNC CHECKING CIRCUITRY 73 (FIG. 3c) comprises a SYNC CHECK LATCH 73A, which is controlled through an OR 73a and reset through OR 73b. ANDs 73c, d, e, and f provide inputs to OR 73a, including inputs from a HOME TEST LATCH 73g set through a CHARACTER COUNTER DECODE AND 73h, MEMORY CYCLE COUNTER 58 inputs, SHIFT REGISTER 62 check inputs, and an ADDRESS COUNTER 22 ADDRESS 144 operation check input.

The use of a READ ONLY STORAGE 36 makes possible a degree of flexibility approaching that of a universal character set, as described in U.S. Pat. No. 3,303,776, issued Feb. 14, 1967, at but a fraction of the cost and with no programming burden at all. In the present machine the CHAIN 162 (FIG. 10) consists of five segments of 60 characters each similar to the five segments of 48 characters in the well-known commercial version. Chains or belts may be assembled with any arrangement at all within the 60-character group, but all five groups must be alike on any one chain. When the operator installs a new CHAIN 162, he inserts the READ ONLY STORAGE DOCUMENT CARD 36 which describes that chain. Card Columns 1–60, Hollerith Bits 2–8 have been assigned for this purpose. Bits 2–8 were chosen for mnemonic reasons to correspond to the bits in the commercially known 360 System Code, which defines the print graphics. As with the universal character set device, the CHARACTER COUNTER 42 of the earlier version of the printer is now the address ring for the chain image storage, in this case, a READ ONLY STORAGE CARD 36.

CARRIAGE CONTROL

Since READ ONLY STORAGE 36 Card Bits 12, 11, 0, 1, and 9, are not needed for the chain image, these have been used for the carriage control functions usually assigned to a punched paper tape. In order to simulate 12-track tape operation, such as provided in the A. w. Mills et al. U.S. Pat. No. 2,531,885, which issued Nov. 28, 1950, with only 64 words of five bits each available, Bits 12 and 11, Columns 1–64, are used for carriage control of Form Lines 1–64, and Bits 0 and 1, Columns 1–64, are used for carriage control of Form Lines 65–128. Bit 9 is used to establish odd parity among all five carriage control bits for checking purposes. Disregarding the parity bit, this part of the card may be thought of as similar to a two-track carriage control tape having a maximum length of 128 lines. It will be seen that these two Tracks 36A12, 36R11 and 36R1, 36R0 can provide all of the format control functions of the 12-track paper tape. Any number of different formats can be coded in a single read only storage card, provided only that the total number of lines in all of the forms does not exceed the capacity of the READ ONLY STORAGE DEVICE 36. In the present instance provision is made for four formats.

The second Read Only Storage Address Ring called the LINES COUNTER 40 (FIGS. 3p–3q) is provided for carriage control purposes. The LINES COUNTER 40 addresses Columns 1–64 sequentially. On the 65th count it returns to Column 1 and again proceeds sequentially until the 138th count is again addressed as Column 64. When a word of the READ ONLY STORAGE CARD 36 is read under control of this COUNTER 40, the five Carriage Control Bits 12, 11, 0, 1, and 9, are read into the data register and checked for odd parity. Since carriage operation and printing are not simultaneous, they can be read into the same data register positions which receive chain image information during Print Scan, thus the 12-bit READ ONLY STORAGE CARD 36 (FIG. 3j) requires only a seven-bit REGISTER 14 (FIG. 3*h*). This is the same register which receives all information routed to and from the READ/WRITE LINE BUFFER 20 (FIGS. 1 and 3*f*–3*g*). Although all five carriage control bits are read for parity checking, only Bits 12 and 11 are analyzed for control purposes during the first 64 counts, and only Bits 0 and 1 during the second 64 counts. This is accomplished by ANDs 68A–D (FIG. 3*o*), which are gated by the ON and OFF outputs of the 40–64 TRIGGER of the LINES COUNTER 40. Thus, 12 and 11 bits serve the same logical functions for the first 64 lines as 0 and 1 bits, respectively, for the second 64 lines. The 12 and 0 bits will be referred to as "CARRIAGE CONTROL 1" and the 11 and 1 bits will be referred to as "CARRIAGE CONTROL 2." Also, Bits 12 and 11, Columns 1–64, will be referred to as "FORMAT LINES 1–64" and 0 and 1, Columns 1–64, will be referred to as "FORMAT LINES 65–128."

A CARRIAGE CONTROL 1, NOT 2 PUNCH serves the same function as the CHANNEL 1 PUNCH in the well-known 12-track paper tape of the A. W. Mills et al., U.S. Pat. No. 2,531,885, which issued Nov. 28, 1950, that is, it identifies the heading line and establishes the form length. For maximum card utilization the user would normally punch CARRIAGE CONTROL 1 in FORMAT LINE 1 Position (i.e., a 12 punch in Column 1). This will identify the heading lines for FORMAT LINE 1. If FORMAT 1 is, for example, 50 lines long, then there must be a CARRIAGE CONTROL 1 PUNCH in FORMAT LINE 51 Position of the READ ONLY STORAGE 36. If there is to be more than one format coded in this READ ONLY STORAGE CARD 36, the second CARRIAGE CONTROL 1 PUNCH also identifies the heading for FORMAT 2. In this manner, each coded format in the card is bracketed by two CARRIAGE CONTROL 1 PUNCHES, with the number of Card Columns from and including the first of these two up to, but not including, the second being equal to the number of lines in the form.

Assume that the FORMAT SELECT SWITCH 77 (FIG. 3*u*) is set on Position 1. Then when power is initially turned on, or when an operator key called LINE 1 SET 78 is depressed, or when the form being printed is advanced to a new heading line, the LINES COUNTER 40 (FIGS. 3*p*–3*q*) is reset to ADDRESS FORMAT 1 Position. If this does not contain a CARRIAGE CONTROL 1 PUNCH, then the COUNTER 40 rapidly advances until it addresses the first position in which there is a CARRIAGE CONTROL 1 PUNCH. It then stops and a LINE 1 LIGHT 81 (FIG. 2*u*) comes on at the operator's panel. If the FORMAT SELECT SWITCH 77 had been on Position 2, 3, or 4, the counter would have searched for the second, third, or fourth CARRIAGE CONTROL 1 PUNCH. Thereafter, the COUNTER 40 advances by 1 and the carriage control bits for the newly addressed column of the READ ONLY STORAGE 36 are read whenever the carriage advances one line from any cause. When the next CARRIAGE CONTROL 1 PUNCH is encountered, the LINES COUNTER 40 again resets and searches for the correct starting point as described above. Depression of the RESTORE KEY 72*b* on the operator panel or receipt of a SKIP TO 1 Command from the processor causes the carriage to move smoothly, advancing the LINES COUNTER 40 for each space of carriage motion until the first CARRIAGE CONTROL 1 PUNCH is encountered. The carriage will not advance, however, if the processor transmits a command to SKIP TO Channel 1 immediately without printing, and the carriage is already at Channel 1. CARRIAGE CONTROL 1 and 2 in the same column serve the overflow function normally assigned to Channels 9 and 12 on the 12-track tape. The first CARRIAGE CONTROL 1 and 2 within a format is treated as Channel 9 and the second as Channel 12. A command to SKIP TO Channel 9 or 12 causes the carriage and the LINES COUNTER 40 to advance until a first or second such code is encountered. If the form had already passed Channel 9 or 12, then it would advance to that position on the next form. When the form has reached Channel 9 or 12, Overflow 9 or 12 Signal may be presented to the computer for appropriate programming action. These signals will remain until the next heading line is reached.

The remaining Channels, 2, 3, 4, 5, 6, 7, 8, 10, and 11, are coded by CARRIAGE CONTROL 2, NOT 1. A first such code is treated as Tape Channel 2, the second as Channel 3, and so on up to the ninth which is Channel 11. A command, for example, to SKIP TO Channel 5 will cause the carriage and LINES COUNTER 40 to advance until the fourth CARRIAGE CONTROL 2 code after the heading line is encountered, whether this be on the present form or the next.

Since some existing programs use the same channel (other than Heading Channel 1 and Overflow Channels 9 and 12) repetitively within the same form, additional provisions have been made to allow this sort of programming. For this purpose a command to SKIP TO Channel 13 causes the carriage and LINES COUNTER 40 to advance until the next CARRIAGE CONTROL 2, NOT 1 is encountered, regardless of the count of such codes.

When initially setting up the machine for a new job, the operator must insert the correct READ ONLY STORAGE CARD 36 for that job and set the FORMAT SELECT SWITCH 77 (FIG. 2*u*). The forms are manually positioned with the heading line of the first form at the print line. The LINE 1 SET KEY 78 is depressed and the LINE 1 LIGHT 81 comes on. Hereafter, the LINES COUNTER 40 in conjunction with the READ ONLY STORAGE 36 must keep track of form position for the entire run. Since any undetected discrepancy would cause all subsequent lines to print in the wrong position on the form, it is necessary to be particularly meticulous in checking the carriage motion versus circuit operation, and since a failure requires operator intervention, the reliability should be such that these failures are extremely rare. An important element in carriage checking is the use of a CHECK TRIGGER 98 (FIG. 3*p*), which is driven as a binary counter for each line of carriage motion such as is the Units Position 40–1 of the LINES COUNTER 40. The LINES COUNTER 40, however, is advanced each time the circuits call for a line of carriage motion, whereas the CHECK TRIGGER 98 is driven by the EMITTER SINGLE SHOT 102*a* (FIG. 3*r*) in consequence of the carriage actually advancing a line, whether the advance was called for or not. The CHECK TRIGGER 98 and LINES COUNTER 40 have a common reset from AND 92 (FIG. 3*p*). Immediately after advancing the LINES COUNTER 40, a test is performed to ensure that its Units Position 40–1 and the CHECK TRIGGER 98 are in different states, and immediately after the CHECK TRIGGER 98 is advanced, a test is performed to ensure that the two have the same state. With this scheme it is quite unlikely that form position and LINES COUNTER 40 will get out of step without detection, since two counters are double checked against each other where one is dependent only on the command to move, and the other is dependent only on the actual motion.

A further check on carriage operations detects failure of the CARRIAGE 100*d* (FIG. 10) to advance on command or excessively slow carriage operation, or failure to recognize arrival at each new line position. This is simply measurement by means of the ADDRESS COUNTER 22 of time from line to line during carriage motion with any time in excess of a certain maximum indicating an error, the maximum time allowable being something more than a nominal single space time and less than double space time.

For the purpose of off-line testing, a fifth position labeled "-Test" is provided on the FORMAT SELECT SWITCH 77 (FIG. 3*u*). With the switch in this position, the printer is effectively disconnected from the computer interface and when the printer is started in this mode, the BUFFER STORAGE 20 is loaded with data read from the chain image section of the READ ONLY STORAGE 36 (FIG. 3*j*). The LINES COUNTER 40 is used to address the READ ONLY STORAGE 36 for buffer loading. Since there are 144 buffer addresses and the LINES COUNTER 40 is Modulo 128, the COUNTER 40 will be partly through its second complete count when the BUFFER 20 is full. During printing the LINES COUNTER 40 is additionally pulsed to bring it back to its original starting value, that is, the total number of drive pulses it will have received by the end of printing is 2 × 128. Then when line spacing, the LINES COUNTER 40 receives its usual increment of 1 so that the new starting value for buffer loading is always one greater than for the preceding line, causing a diagonal print pattern with every chain character ultimately printing at every hammer position. In Test mode the detection of Overflow 12 causes an automatic SKIP TO Channel 1. The result is a thorough test of all mechanisms and most circuits without requiring computer time or programming.

I. INTRODUCTION

All communications between the printer and a computer (not shown), which is connected for controlling the printer in the subject Printer Control System 10 through the BUS OUT DATA LINES 12, such as the LINES 12-4, 12-2, 12-1, 8A and B (FIG. 3*j*), which comprise B, A, 8, 4, 2, 1 BIT LINES, a PARITY LINE C, a WORD MARK LINE WM, a STROBE LINE, which the computer raises to indicate that a byte of information is ready for transfer to the printer, and the READY LINE, which the printer raises to signal it is ready to receive information from the computer. In operation, the printer signals that it is ready to receive information, either commands or data, by raising the READY LINE at the INVERTER 741 (FIG. 3*s*) connected to a READY LATCH 74 (FIG. 3*r*). The computer, at its convenience, places the information on the BUS OUT BIT LINES 12 (FIGS. 1 and 3) and then indicates the presence of this information on the STROBE LINE (FIG. 3*r*), which raises Data Strobe at OR **76*a* through AND 76 *b*. The printer stores the information byte in the DATA REGISTER 14** (FIG. 3*k*) and resets the READY LATCH 74 (FIG. 3*r*) through OR **74*a*. When the printer has performed whatever operation is required by that information byte, it again raises the READY LINE at INVERTER 74l and the information transfer sequence repeats. A Rate Error is indicated at AND 74*b*** (FIG. 3*s*), if the computer attempts to strobe an information byte to the printer when the Ready Signal is down. Otherwise, there is no timing restriction on transfer of commands or data.

There are two general categories of command:

a. Immediate Carriage Operation b. Print Followed By Carriage Operation

Of the 64-odd parity commands possible with a seven-bit information byte, 34 are recognized as valid by the printer. Receipt of any of the other 30 bit combinations will indicate an INVALID ERROR at LATCH 75 (FIG. 3*k*) through DECODE ANDs **75*a–d*, OR 75*e*, and AND 75*f*. Receipt of a command having an even number of bits will indicate a Data Validity Check Error at LATCH 72*a* through INVERTER 72*p*, AND 72*k*, and OR 72*j*. The 17 category (a) commands are listed in TABLE 1 (FIG. 5), and the 17 category (b) commands are listed in the TABLE 2 (FIG. 6). Since the interface or BUS OUT LINES 12** do not have tag or control lines, a command is distinguished from print data by virtue of being the first data byte strobed to the printer from the computer after completion of the preceding operation or after a restart procedure.

Figure 2:
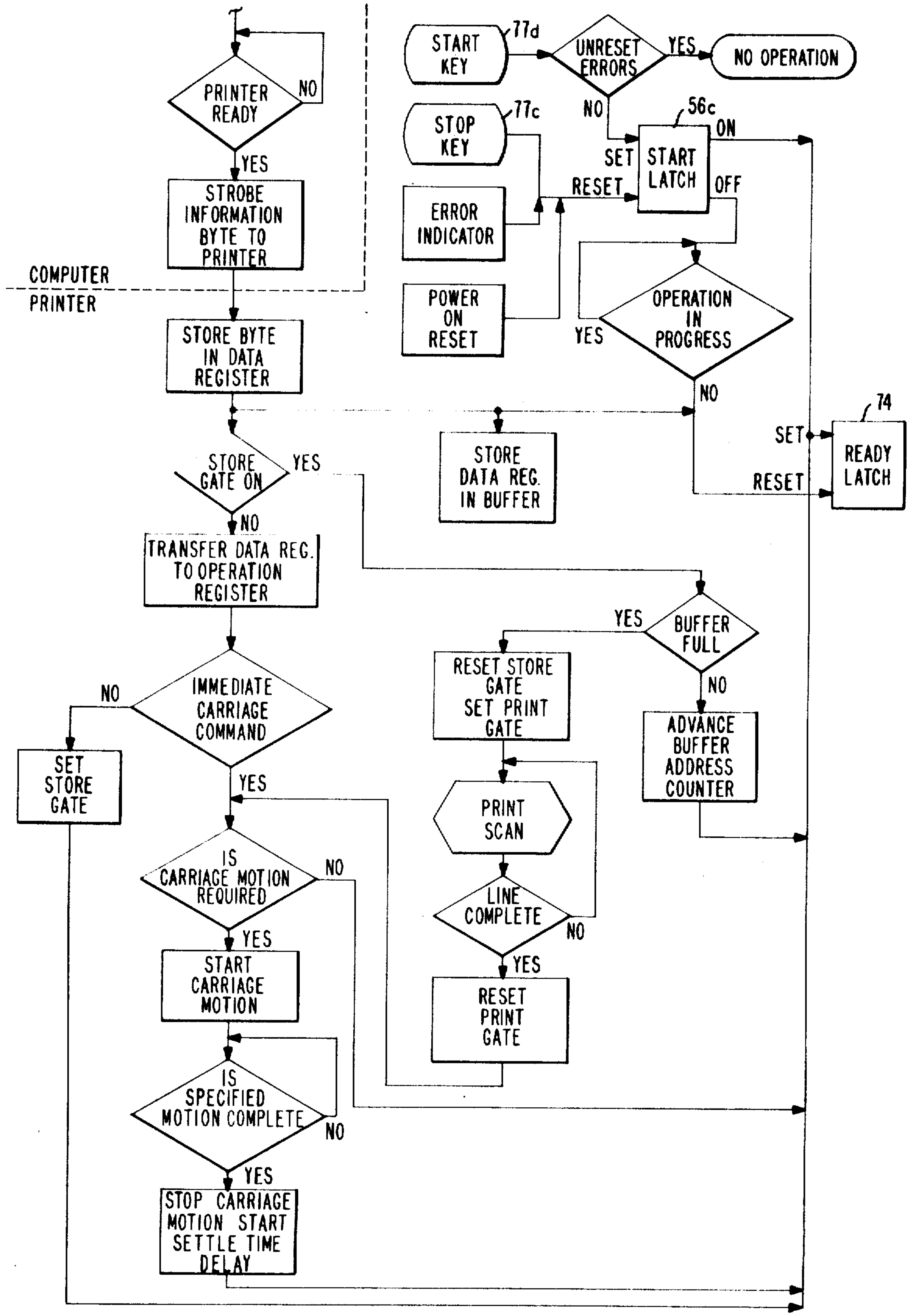
FIG. 2 is a flow chart showing a typical sequence of operations in the control system of FIG. 1.

The flow of major events in processing a command is illustrated in the flow chart of FIG. 2. Error checkpoints are not included in the flow chart. Two loops in the chart, which will be explained, are "Carriage Motion" and "Print Scan." These are the two major applications of the READ ONLY STORAGE 36 in the printer control system. The remainder of this description will, therefore, treat carriage and print operations in greater detail.

II. CARRIAGE CONTROL

The following sections describe in some detail the manner in which carriage control operations are effected.

II.1 FORMAT SEARCH (search for the start or heading line of a form)

Since the READ ONLY STORAGE 36 (FIGS. 1 and **3*j*) can contain carriage control information for more than one format in the 36-12, 36-11, 36-0, 36-1, and 36-9 bit positions, which are used for carriage control data, it is necessary at certain times to adjust the LINES COUNTER 40** (FIGS. 3*p* and 3*q*) to locate the desired format or heading line data representation for a form in the READ ONLY STORAGE 36, that is, to set the LINES COUNTER 40 to a value which will address the first character of the particular format indicated by the setting (Positions 1–4) of a FORMAT SELECT SWITCH 77 (FIG. 3*u*). Thereafter, the LINES COUNTER 40 will increment by one for each line of paper motion until the end of the form is reached, at which time the FORMAT SEARCH operation is repeated. Format searching is initiated by one of the following:

a. The occurrence of a Power ON Reset Signal;

b. Depression of a LINE 1 SET KEY 78 (FIG. 3*u*);

c. A form advances to a new heading line.

The three initiating conditions can be seen by the combination in OR 80 (FIG. 3*o*). In the case of the Power ON Reset Signal, the operation may repeat a number of times, since this input is not controlled as to duration, and may be still present when the operation is completed, but the COUNTER 40 will eventually assume the desired value.

The sequence of events for a specific example is illustrated in FIG. 7, which shows a plurality of timing curves illustrating a FORMAT SEARCH sequence. The operation is initiated by depressing the LINE 1 SET KEY 78 (FIG. 3*u*). With the FORMAT SELECT SWITCH 77 (FIG. 3*u*) on Position 2, assume that the READ ONLY STORAGE CARD 36 is punched so that FORMAT 1 is three lines long and FORMAT 2 designated by the second CONTROL CODE 1, NOT 2 begins in READ ONLY STORAGE COLUMN 36-4 -36A3- (FIG. 3*j*), which is addressed by the Lines Counter value of 3 through AND 38-3 (FIG. 3*i*). While a form as short as three lines is not likely to occur often in practice, the principle of operation will be the same regardless of the length of the form. READ ONLY STORAGE Positions 36-12 and 36-11 are used for CONTROL CODES 1 and 2, respectively, for the first 64 lines of format control while the 36-0 and 36-1 positions are used for the next 64 lines.

The objective is to cause the LINES COUNTER 40 (FIGS. 3*p*-3*qa*), which is initially at some unknown value to reset to zero, then to advance rapidly until it encounters the second READ ONLY STORAGE CARRIAGE CONTROL CODE 1, NOT 2 stored in the 12 and 11 bit positions of the READ ONLY STORAGE 36, at which time the COUNTER 40 is to stop advancing and the LINE 1 INDICATOR 81 (FIG. 3*u*) turned on by the LINE 1 TRIGGER 43 (FIG. 3*q*). The printer is to be held in a NOT READY condition by the READY LATCH 74 (FIG. 3*r*) during the entire operation. Since the sequence chart of FIG. 7 shows the complete sequence, only the following major points will be explained to assist in following the operation.

A SINGLE OPERATION LATCH 84 (FIG. 3*o*) set through AND **84*a* and reset through OR 84*b* is used to prevent repeating the operation, regardless of the amount of time the LINE 1 SET KEY 78** (FIG. 3*u*) is held depressed. At other times the SINGLE OPERATION LATCH 84 is used to prevent repetitive spacing or restoring when KEYS **77*a* or 77*b*** (FIG. 3*u*) for these operations are held depressed. The only reason for preventing repetitive format searching is that the LINE 1 INDICATOR 81 would not otherwise be visible until the key was released, and this is the only indication to the operator that depression of the key has had the desired effect.

The READ TIME RING 52 (FIG. 3*r*) comprising TRIGGERS 52-1, 52-2, and 52-4 with DECODE ANDs **52*a–g*** is used as a convenient source of pulses to cycle throughout sequence. In order to prevent close timing conditions and spikes only every other pulse is used. The odd numbered pulses 1, 3, 5, and 7, have been selected. Three latches, FORMAT SEARCH 1, 2, and 3 (FIGS. 3*p*–3*q*), designated by the numerals 86, 88, and 90, respectively, are staggered in their set and reset times in order to gate special conditions occurring at the beginning and end of the sequence. For example, the Line Counter Reset Signal produced at a three-way AND 92 (FIG. 3*p*) having the inputs FORMAT SEARCH 1, NOT FORMAT SEARCH 2, and RT7, occurs only once at the start of the sequence. Since the interval from the rise of FORMAT SEARCH 1 to the fall of FORMAT SEARCH 2 spans the entire sequence, these signals are used to maintain a NOT READY CONDITION through the five-way OR 94 (FIG. 3*t*), AND 94*a*, and the READY LATCH 74 (FIG. 3*r*).

Since the ADDRESS COUNTER 22 (FIG. 3*e*) is not used for any other purpose during format searching, its Positions 1 and 2, 22–1 and 22–2, are used to count the CARRIAGE CONTROL 1, NOT 2 heading line codes encountered in the READ ONLY STORAGE DEVICE 36 as the LINES COUNTER 40 is advanced. The ADDRESS COUNTER 22 will be advanced from 0 to 1 when the first CARRIAGE CONTROL 1, NOT 2 code is encountered as the ADDRESS COUNTER 22 advances in response to Format Count Drive Signal applied to TRIGGER 22–1 through OR 22*e* (FIG. 3*d*) from AND 86*b* (FIG. 3*q*). In our example, this will be in the READ ONLY STORAGE COLUMN 36–0. The Address Counter value of 1 is routed through the FORMAT SELECT SWITCH 77, Position 77–2 (FIG. 3*u*), and applied to the FORMAT FOUND AND 86*c* (FIG. 3*q*) to reset FORMAT SEARCH 1 LATCH 86 and to terminate the operation when the next CARRIAGE CONTROL 1, NOT 2 is encountered. The ADDRESS COUNTER 22 is not needed or used if the FORMAT SELECT SWITCH 77 is on Position 1, since in that case the operation is terminated as soon as the first CARRIAGE CONTROL 1, NOT 2 Signal is encountered.

Referring to FIGS. 3*j* and 3*k*, it will be seen that the CARRIAGE CONTROL 1, NOT 2 bits from the READ ONLY STORAGE Bit Positions 12, 11, 0, 1, and 9 are routed to the DATA REGISTER 14 Positions 14–2, 14–3, 14–4, 14–5, and 14–8, respectively. This is done to conserve positions in the DATA REGISTER 14, since they are not used for other purposes during carriage control or format searching operations. A 12 punch in the 36–12 bit position of the READ ONLY STORAGE 36 CARD is used for the Carriage Control 1 Signal for Lines 1 to 64 of the form, but since a punch in a card results in the absence of a pulse when that position is sampled, then Carriage Control 1 Signal is indicated by Data Register Not 2 Signal. This is seen in the CARRIAGE CONTROL DECODE CIRCUIT (FIG. 3*o*) including the ANDs 68A–F, ORs 68I–J, and INVERTERS 68G–H. Since, for checking purposes, it has been decided to require an odd number of punches in the carriage control area of each READ ONLY STORAGE 36 Column, this results in an error condition on an odd number of bits in the data register.

During format searching the following steps are performed at the respective RT times of the READ TIME RING 52 (FIG. 3*r*) for each new value of the LINES COUNTER 40.

RT 1. RESET DATA REGISTER 14 through OR 48*f* (FIG. 3*b*) and AND 86*d* (FIG. 3*p*) preparatory to reading a new column, and for every step except the first, increment the LINES COUNTER 40 by 1 and reverse the state of a CHECK TRIGGER 98.

RT 3. Read out the READ ONLY STORAGE 36 addressing the column indicated by the current value of the Lines Counter and test the Units Position 40–1 of the LINES COUNTER 40 (FIG. 3*p*) to see if it agrees with the position of the CHECK TRIGGER 98, indicating an error if the two triggers are in opposite states.

RT 5. Test DATA REGISTER 14 for correct parity and test for Format Found through AND 86*c* through the selected position of the FORMAT SELECT SWITCH 77 (FIG. 3*u*) (in this case 77–2). If the Format Found Signal occurs at AND 86*c*, FORMAT SEARCH 1 and 3 LATCHES 86, 90 are reset, and the LINE 1 TRIGGER 43 is set.

RT 7. If Format Found did occur on the previous step, as indicated by FORMAT SEARCH 1 LATCH being now reset, reset FORMAT SEARCH 2 LATCH, terminating the operation. If CARRIAGE CONTROL 1, NOT 2 Signal occurs, but Format Found Signal did not occur on the previous step, the ADDRESS COUNTER 22 is incremented by 1. If Format Found did not occur on the previous step, the sequence is repeated starting at the next RT 1.

II.2 CARRIAGE MOTION

The electronic operations involved with carriage motion can be thought of as divided as between those which cause and perform the electrical and mechanical functions directly concerned with carriage motion, and those which check that the functions were performed correctly. Major operations in the first category are:

a. Start the carriage motion on command.
b. Advance the LINES COUNTER 40 for each line of carriage motion.
c. Read the carriage control section of the READ ONLY STORAGE 36 at each new value of the LINES COUNTER 40.
d. Keep count of the CARRIAGE CONTROL 2, NOT 1 (normal skip channels) encountered in the READ ONLY STORAGE 36.
e. Keep count of the CARRIAGE CONTROL 1 and 2 (overflow channels) encountered in the READ ONLY STORAGE 36.
f. Perform a new FORMAT SEARCH operation whenever a new CARRIAGE CONTROL 1, NOT 2 Signal is encountered.
g. Stop the carriage when the specified motion is complete.
h. Maintain the printer in a NOT READY condition for the entire operation up to, but not including, a fixed settle time at the end.

Major operations in the second category are:

a. Test that the carriage does not move unless properly commanded to do so.
b. Test that each line-to-line motion is completed within a specified maximum amount of time.
c. Test that the LINES COUNTER 40 advances one, and one only, for each new line.
d. Test for parity of the DATA REGISTER 14 at each time the READ ONLY STORAGE 36 is read out.
e. Check that the carriage stops on a specified line and does not overthrow to the next line.
f. Stop the carriage and indicate an error in the event of failure to locate the specified skip channel.

In the following discussion it is assumed that the printer carriage, represented schematically in FIG. 10 by the DRIVE SPROCKET 100*d*, controlled by a CLUTCH MAGNET 100, is so constructed that it will advance forms continuously as long as the SINGLE CLUTCH MAGNET 100 (FIG. 3*q*) is energized through DRIVER 100*a* and that feedback from carriage motion to the control circuits is accomplished by EMITTER MEANS 102 including a TOOTHED or SLOTTED EMITTER DISC 102D and an OPTICAL or MAGNETIC PICKUP 102P driven by the CARRIAGE 100*d* and which provides an input to an EMITTER SINGLE SHOT 102*a* (FIG. 3*r*) through an AMPLIFIER 102*b* and AND 102*c* (INVERTER 102I provides a Not Emitter Single Shot Signal), which is at a logical zero when the CARRIAGE 100*d* is at rest in print position and which emits a signal as each new line is approached, sufficiently early that it can be used to terminate the signal to the CLUTCH MAGNET 100 in time to allow the CARRIAGE 100*d* to come to rest at that approaching print line.

Every carriage motion will be started by turning on first the GO DELAY LATCH 110 (FIG. 3*q*) followed by a GO LATCH 112. These two latches are used in order to control not starting a new carriage operation until the preceding operation is completed as determined by the Not Settle Time condition required for the set of the GO LATCH 112 through AND 112*a*. Carriage motion is terminated by resetting the GO LATCH through OR 112*b* (FIG. 3*p*) if:

a. On a space operation the number of spaces specified in the OPERATION REGISTER 16 (FIG. 3*n*) has been taken.
b. On a skip operation the specified channel has been reached.
c. Any of the carriage error conditions listed earlier are detected.

A carriage operation is initiated by setting the GO DELAY LATCH 110 (FIG. 3*q*) under the following conditions:

a. Immediately upon receipt of any command listed in TABLE 1 (FIG. 5) except NO OPERATION, unless the command specifies skipping to Channel 1 when the carriage is already at Channel 1.
b. On completion of printing for any command listed in TABLE 2 (FIG. 6), except PRINT WITH NO CARRIAGE MOTION.
c. On depression of the SPACE KEY 77*a* or RESTORE KEY 77*b*, if the STOP LIGHT 83*a* is on.

The three start conditions listed above all require that the DATA VALIDITY CHECK LATCH 72*a* (FIG. 3*m*) and the INVALID OPERATION LATCH 75 not be set (FIG. 3*k*).

II.3 SPACE

For any space operation the OPERATION or COMMAND REGISTER 16 (FIG. 3*n*) is set to NOT OP 4, NOT OP 8, NOT OP SKIP, and some combination of OP 1 and OP 2 TRIGGERS 16-1, 16-2, such that the binary value of OP 1 and OP 2 indicates the number of spaces (1, 2, or 3) required. The GO DELAY LATCH 110 (FIG. 3*q*) is set either immediately or on completion of printing by the Carriage Start Signal from AND 16*n* and OR 16*m* (FIG. 3*n*) in response to an Immediate Command which contains an A which is detected in the 6 position 14-6 of the DATA REGISTER 14 (FIG. 3*k*), or from a Line Complete Signal from AND 72*i* (FIG. 3*m*). The OP 1 and OP 2 TRIGGERS 16-1, 16-2 are connected as a decrementing binary counter.

For each line space taken the value of the TRIGGERS 16-1 and 16-2 is decreased by 1 through AND 136 (FIG. 3*n*) until they are both off at which time the GO LATCH 112 is reset through OR 112*b* (FIG. 3*q*) and the operation terminated. The LINES COUNTER 40 (FIGS. 3*p*-3*q*) is incremented for each line by Lines Counter Drive Signal from AND 116 through OR 120 (FIG. 3*t*) and the newly addressed Read Only Storage Column is read out through operation of the READ ONLY ADDRESSING MATRIX 38 (FIG. 3*i*) in order to count skip or overflow channel codes encountered during spacing, or to initiate a format search operation in the event that a new heading line code is reached. The sequence of events for a double spacing is shown by the curves in FIG. 8. It should be emphasized that while the READ ONLY STORAGE 36 does not have any function directly related to a space operation, it is still necessary to read the READ ONLY STORAGE 36 for each space of carriage motion in order to recognize and count skip channel code designations which may be encountered in the carriage control portion of the READ ONLY STORAGE 36, and to perform format searching if the CARRIAGE 100*d* spaces into or past the heading line.

Referring to FIG. 8 it will be assumed that a double space command is stored in the OPERATION or COMMAND REGISTER 16 (FIG. 3*n*). The operation is started by setting the GO DELAY LATCH 110 (FIG. 3*q*) through AND 110*a*. If the SETTLE TIME SINGLE SHOT 114 (FIG. 3*a*) is not still on from a preceding operation, Not Settle Time from INVERTER 114I (FIG. 3*a*) will be on, and the GO LATCH 112 (FIG. 3*q*) is set at the next READ TIME 7 through AND 112*a*. The CLUTCH MAGNET 100 is energized by the GO Signal through DRIVER 100*a*, but it will be a matter of milliseconds before any appreciable motion occurs. At the next READ TIME 1, the DATA REGISTER 14 (FIG. 3*k*) is reset by a Data Register Reset Signal from OR 48*f* (FIG. 3*b*) in response to a Carriage Register Reset Signal from AND 116 (FIG. 3*s*) and the LINES COUNTER 40 (FIGS. 3*p*-3*q*) is incremented by one in response to a Lines Counter Drive Signal from OR 120 (FIG. 3*t*). At READ TIME 3 carriage control information from the new Read Only Storage Address is read out to the DATA REGISTER 14 in response to ROS Readout Signal from AND 118 through OR 115 (FIG. 3*s*) (AND115*a* provides an input to OR 115 when testing). At this same READ TIME 3 the condition of the UNITS TRIGGER 40-1 of the LINES COUNTER 40 is compared with that of the CHECK TRIGGER 98 through Exclusive OR 121 (FIG. 3*p*) and AND 121*a* and INVERTER 121*b* by the Carriage Check Sample Signal from AND 118 (FIG. 3*s*). They should be in opposite states at this time, since the LINES COUNTER 40 has been advanced and the CHECK TRIGGER 98 has not. At READ TIME 5 the CARRIAGE MOTION 1 LATCH 122 (FIG. 3*s*) is set through AND 126 to prevent recurrence of the preceding steps until the first space has been completed and to prepare for the steps which will occur after receipt of a Carriage Emitter Signal. A test for failure of the carriage to move or for expressively slow carriage motion utilizes the ADDRESS COUNTER 22 (FIG. 3*e*), since it is not needed for other purposes during carriage motion. The Address Counter Reset Signal through AND 128 is removed when the GO LATCH 112 is set, removing the NOT GO Signal from AND 128, and TRIGGER 22-8 of the ADDRESS COUNTER 22 is now driven by a pulse PSS NOT 1, NOT 2 from the PSS COUNTER 32 through DECODE AND 32*a*, OR 22*b*, and AND 22*c*. Other DECODE ANDs 32*b*-*d* and INVERTER 32*e* provide other Print Scan Signals. The ADDRESS COUNTER 22 will continue to advance and will not again be reset until after the Emitter Signal from EMITTER SINGLE SHOT 102*a* (FIG. 3*r*) produces the Carriage Channel Test Signal at AND 130 (FIG. 3*t*) as evidence of carriage motion. If the COUNTER 22 achieves a certain fixed value (determined by the normal mechanical speed of the carriage) a CARRIAGE NO GO error is indicated at AND 132 (FIG. 3*g*). Because of acceleration time the counter value used is greater for the first space (a count of 48 + 12) than for subsequent spaces of a multiple space operation (a count of 48 only). This is controlled by the Go Delay Signal, since the GO DELAY LATCH 112 is on for the first space only. The ADDRESS COUNTER 22 is tested for the selected maximum value every READ TIME 5 at AND 132 (FIG. 3*g*) as long as the GO LATCH 110 (FIG. 3*q*) is on.

The next series of events in the operations starts with the receipt of an Emitter Signal upon movement of the CARRIAGE 102*d*. The EMITTER SINGLE SHOT 102*a* (FIG. 3*r*) triggered by the Emitter Signal and by RT 7 Signal serves to buffer noise and discontinuities from the leading and trailing edges of the Emitter Signal and to provide a working signal with a good leading edge rise time. The SINGLE SHOT 102*a* duration must be somewhat longer than the normal duration of the Emitter Signal. The Carriage Channel Test Signal generated at AND 130 (FIG. 3*t*), which starts with the rise of the Emitter Single Shot Signal at READ TIME 7 and extends for 6 microseconds until CARRIAGE MOTION 2 LATCH 124 (FIG. 3*s*) is set at the next READ TIME 5 through AND 134 causes or gates all significant events at this stage of the operation. The functions of this signal are:

a. Reset ADDRESS COUNTER 22 through OR 22d (FIG. 3*e*), thus preventing a CARRIAGE NO GO indication at AND 132 (FIG. 3*g*), if carriage motion has been fast enough. Since this is not the last space of the operation, the CARRIAGE NO GO Test will start over again after this reset, since the PSS NOT 1, NOT 2 Signal is still occurring at AND 32*a* (FIG. 3*e*) and starts driving the ADDRESS COUNTER 22-8 position after the Reset Signal is removed.
b. Decrement the OP 1 and OP 2 TRIGGERS 16-1 and 16-2 of the OPERATION or COMMAND REGISTER 16 through AND 136 (FIG. 3*n*). Since, in the present example, they had started at a value of 2, NOT 1, they will now be 1, NOT 2.
c. Increment the CHECK TRIGGER 98 through OR 98*a* (FIG. 3*p*). It should then be in the same state as the UNITS POSITION TRIGGER 40–1 of the LINES COUNTER 40.

d. Perform a parity check on the carriage control information at LATCH 72*b* through OR 99*c*, AND 138, and OR 138*a* (FIG. 3*m*) from the CHECK CIRCUIT 72 (FIG. 1) which information had earlier been read from the READ ONLY STORAGE 36 to the DATA REGISTER 14.

e. Test the carriage control information from the READ ONLY STORAGE 36 for appropriate action if channel data had been read from READ ONLY STORAGE 36;
   1. If 1 and 2 increment the OVER-FLOW COUNTER TRIGGERS 70*a*, 70*b* (FIG. 3*o*), through AND 68E,
   2. If 2, NOT 1 increment the BLOCK COUNTER 68 through AND 68F (FIG. 3*o*),
   3. If 1, NOT 2 initiate a FORMAT SEARCH OPERATION through AND 100*c*, OR 80, and AND 86*a* at READ TIME 3 (FIGS. 3*o* and 3*p*).

f. At READ TIME 3 test for NOT OP 1 and NOT OP 2 (at AND 144 through the action of Stop Sample from AND 140) of OPERATION or COMMAND REGISTER 16 TRIGGERS 16–1, 16–2 (FIG. 3*n*) which would indicate that spacing is complete and the operation should be terminated. In this case the test should be negative.

g. At READ TIME 3 reset the GO DELAY LATCH 112 (FIG. 3*q*) by a Stop Sample Signal generated at AND 140 (FIG. 3*t*). This will allow a CARRIAGE NO GO indication at AND 132 (FIG. 3*g*) at an earlier Address Register count on subsequent spaces.

h. At READ TIME 3 test through OR 143 and AND 142 (FIG. 3*p*) that the CHECK TRIGGER 98 (FIG. 3*p*) and the UNITS POSITION TRIGGER 40–1 of the LINES COUNTER 40 (FIG 3*p*) are at the same state. Note that the LINES COUNTER 40 has been incremented in consequence of the GO Signal being on, whereas the CHECK TRIGGER 98 was incremented and this test performed because of the receipt of an Emitter Signal, regardless whether or not the GO Signal had been set. Therefore, this second test will detect erroneous carriage motion as, for example, overthrow beyond the intended Stop Position. Also, the double test gives a high degree of assurance that the LINES COUNTER 40 is functioning correctly. This is of considerable importance in tapeless carriage operation, since, if the LINES COUNTER 40 were to get out of step with paper position and the condition was not detected, then all subsequent printing would be incorrectly positioned on the forms.

CARRIAGE MOTION 2 LATCH 124 (FIG. 3*s*) is set at READ TIME 5 by AND 134 from AND 52*g* (FIG. 3*r*) and prevents any further electronic events other than continued CARRIAGE NO GO testing until the fall of the Emitter Single Shot Signal from SINGLE SHOT 102*a*. At the first READ TIME 7 Signal after the EMITTER SINGLE SHOT 102*a* turns off, CARRIAGE MOTION 1 LATCH 122 is reset from AND 122*a* and OR 122*b*. CARRIAGE MOTION 2 LATCH is then reset at the next READ TIME 1 through AND 124*a* (FIG. 3*r*) and operations concerned with the second space begin. The second space proceeds in much the same manner as the first, but the starting conditions are somewhat different. The carriage is already in motion, the GO DELAY LATCH 110 (FIG. 3*q*) has been reset, OP 1 and OP 2 LATCHES 16–1 and 16–2 (FIG. 3*n*) have been decremented, and the LINES COUNTER 40 (FIGS. 3*p*–3*q*) has been incremented. At READ TIME 3 of Carriage Channel Test time for this space OPERATION REGISTER TRIGGERS 16–1 and 16–2 are both off, so that the STOP Test is positive and the GO LATCH 112 (FIG. 3*g*) is reset through OR 112*b* and AND 144 (FIG. 3*o*), deenergizing the CLUTCH MAGNET 100 and triggering the SETTLE TIME SINGLE SHOT 114 through AND 114*a* (FIG. 3*a*). The printer has been maintained in a NOT READY status by READY Control Signal from AND 94*a* (FIG. 3*t*) for the entire operation by the overlapping signals GO Delay, GO, and Carriage Channel Test. The READY Signal is restored at the end of this second Channel Test time unless the carriage happened to have spaced to a new heading line in which case the READY Signal is further delayed by the presence of the FORMAT SEARCH 2 Signal in OR 94 and AND 94*a* (FIG. 3*t*), which produces the READY Control Signal maintaining the READY LATCH 74 in the reset position through OR 74*a*. The computer can transfer the next command and line or print data at anytime after the READY Signal comes up. In order to maintain the maximum printing speed this must be done before the end of SETTLE TIME SINGLE SHOT 114 (FIG. 3*a*). Printing or carriage motion for the next command can begin anytime after the end of the SETTLE TIME SINGLE SHOT 114 Signal.

The operation of single spacing and triple spacing should be apparent from the preceding description of double spacing, which was taken as a representative example. In the case of a space command (i.e., not skip) in which case neither OP 1 nor OP 2 TRIGGERS 16–1 and 16–2 of COMMAND REGISTER 16 (FIG. 3*n*) are set, carriage motion is prevented by blocking the set of the GO DELAY LATCH 110 through AND 110*a* (FIG. 3*q*) at AND 150 through OR 152 (FIG. 3*o*), since either OP 1 or OP 2 must be on at OR 150*a* to gate AND 150.

II.4 SKIP

The primary function of the carriage control portion of the READ ONLY STORAGE 36 is the control of forms skipping, that is, the rapid advance of the forms to fixed, predetermined lines. A secondary purpose is to provide program recognition that certain key positions on the form, such as the last allowable print line, have been reached.

For accurate alignment of pre-printed forms with the print line, the forms are usually edge-punched and moved by TRACTORS 100*d* driven by the carriage mechanism. In setting up the machine for a new job the operator adjusts the forms manually so that the heading line of the first form is in position to be printed. He then depresses the LINE 1 SET KEY 78 (FIG. 3*u*), causing the LINES COUNTER 40 (FIG. 3*u*) to locate the desired format coded representation in the READ ONLY STORAGE 36, as described under FORMAT SEARCH Section II.1. Thereafter the LINES COUNTER 40 (FIGS. 3*p*–3*q*) will advance by one each time the forms are told to advance. If the READ ONLY STORAGE 36 (FIG. 3*j*) is correctly coded with the same number of spaces assigned in the READ ONLY STORAGE 36 as there are spaces in the entire length of one form, then a CARRIAGE CONTROL 1, NOT 2 code will be encountered and a new Format Search initiated as the heading line of each new form advances to printing position. The forms can be caused on command to advance rapidly from any position to some fixed position further down the form by identifying the fixed positions by a scheme of unique coding at the Read Only Storage Address corresponding to the desired fixed position as shown by the codes in TABLE 3 in FIG. 8.

II.5 SKIP TO CHANNEL 1

A command to SKIP TO Channel 1 (see TABLE 1 and TABLE 2) causes the CARRIAGE 100*d* (FIG. 10) to advance the forms continuously while the control circuits advance the LINES COUNTER 40 (FIGS. 3*p*–3*q*) for each space of forms movement and read out the successive READ ONLY STORAGE 36 locations in the same manner as described for double spacing. The GO LATCH 112 (FIG. 3*q*) is reset to stop forms motion and a FORMAT SEARCH operation is initiated when a Read Only Storage Address containing a CARRIAGE CONTROL 1, NOT 2 is read. Recognition of the STOP condition is accomplished by a five-input AND 17*a* (FIG. 3*n*), which is connected to provide a Reset Signal for the GO LATCH 112 through OR 17*q*, AND 17*s*, and OR 112*b* (FIG. 3*p*). If the command is an immediate SKIP TO 1 (TABLE 1) and the form is already at the heading line as indicated by the LINE 1 TRIGGER 43 (FIG. 3*q*) being on, then in order to avoid wasting a form, the operation is blocked by a five-way AND 67 (FIG. 3*o*), which inhibits turning on the GO DELAY LATCH 110 through INVERTER 67*a* and AND 69.

II.6 SKIP TO CHANNEL 9 OR 12

Channels 9 and 12 are treated differently from the others because of their use as overflow channels which indicate the approach of the end of the form or the fact that the end of the form has already passed. In actual application signals are made available at the computer for interrogation to indicate that the form has advanced as far as one or the other or both of these channels. The normal use of these Channels 9 and 12 is to regard the first as a signal that the end of the form is approaching and a Skip Command should be issued to advance past the perforations to the next form, and to regard the second as an error signal in that printing should not have been done that close to the bottom of the form.

Each time the CARRIAGE **100*d* advances a line, whether spacing or skipping, the Read Only Storage carriage control data is tested at Carriage Channel Test Time through AND 68**E (FIG. 3*o*) and if there is a CARRIAGE CONTROL 1 and 2, the OVERFLOW TRIGGERS **70*a* and 70*b* are operated. The first CARRIAGE CONTROL 1 and 2 sets the OVERFLOW 9 TRIGGER 70*a* and the second sets the OVERFLOW 12 TRIGGER 70*b*. The OVERFLOW TRIGGERS 70*a* and 70*b* are reset by the LINE 1 TRIGGER 43** (FIG. 3*q*) when the next heading line is reached. On a command to SKIP TO Channel 9 (or 12), the carriage advances until the first (or second) CARRIAGE CONTROL 1 and 2 coded representation after the heading line is read from the READ ONLY STORAGE 36. If the form has already passed that line, it will advance to that position on the next form, passing Channel 1 with consequent format searching in the process. The STOP conditions for SKIP TO 9 and SKIP TO 12 are detected by five-way ANDs **17*c* and 17*b***, respectively (FIG. 3*n*). If the specified channel is not found either because it is not punched in the READ ONLY STORAGE 36 for the format in use, or because of a circuit failure, then Channel 1 representation will be encountered twice. This condition is detected by the 2nd LINE 1 TRIGGER 154 (FIG. 3*q*) setting the CARRIAGE CHECK LATCH 156 through AND **155*a* and OR 155*b***, stopping the carriage and indicating an error condition to the operator.

II.7 REPETITIVE SKIP

A command to SKIP TO Channel 13 causes the carriage to advance until the next CARRIAGE CONTROL 2, NOT 1 coded representation is encountered in the READ ONLY STORAGE 36. The STOP condition is detected by a three-way AND **17*d*** (FIG. 3*n*). Failure to locate any CARRIAGE CONTROL 2, NOT 1 coded representation will result in the 2nd LINE 1 error condition described in the preceding section. There is no limit to the number of Channel 13 Skip stops that can be used in a single format within the maximum form lengths imposed by the Read Only Storage capacity.

II.8 NORMAL SKIP

Normal skipping utilizes the modified four-bit binary counter labeled BLOCK COUNTER 68 (FIG. 3*o*). The COUNTER 68 is reset to BINARY 1 (1, NOT 2, NOT 4, NOT 8) by the LINE 1 TRIGGER 43 (FIG. 3*q*) at each new heading line. It is then incremented each time a CARRIAGE CONTROL 2, NOT 1 coded representation is read from the READ ONLY STORAGE 36 through AND 68F (FIG. 3*o*). The BLOCK COUNTER 68 is designed to skip over the value 9 as determined by a three-way AND 68I, which decodes a 9 count, advancing directly from 8 to 10 because Channel 9 is a special case of an overflow channel rather than a normal skip channel. If the COUNTER 68 advances to where both the 8 TRIGGER 68-8 and the 4 TRIGGER 68-4 are on (i.e., a value of 12 or more), then both triggers will remain on regardless of the number of additional CARRIAGE CONTROL 2, NOT 1 codes encountered before the heading line. This is because values greater than 11 are not valid for normal skipping (see TABLE 3) and a combination of 8 and 4 can be used to block erroneous recognition of carriage STOP conditions, if the COUNTER 68 has advanced that far. On a normal skip the forms are advanced up to that line on which the BLOCK COUNTER 68 first assumes the same numerical value as the OPERATION REGISTER 16 (FIG. 3*n*) Positions 16-1, 16-2, 16-4, and 16-8. The comparison is accomplished at a five-way AND **17*r*** (FIG. 3*n*). If at the time of the Skip Command the form is already at or past the specified line, the carriage will advance to the specified line on the next form. If the specified channel cannot be located as indicated by encountering the heading line twice, the carriage will stop, and an error condition will be indicated.

III. PRINT SCAN

An on-the-fly, high-speed impact printer usually consists of the following major elements as shown schematically in FIG. 10:

a. A row of PRINT HAMMERS 160-1-144 (shown in part only to conserve space) normally one for each print position in the line.
b. A continuously moving print element such as a TYPE CHAIN 162 mounted on PULLEYS, or the like, **162*a-b*, and consisting of an array or arrays of engraved CHARACTERS 162-1-60** so arranged that over a period of time every character in the set passes in front of every print hammer.
c. A sensing device such as EMITTERS 32A and 32B (FIGS. 3*b* and 10) to provide the control circuits with information as to the instantaneous position of the print element relative to the hammers.
d. Means such as the carriage or tractor represented by the SPROCKET WHEEL **100*d* (FIG. 10) for moving and positioning FORMS 168 between the HAMMERS 160-1 through 160-144 and the moving PRINT ELEMENT 162**.
e. Control means such as the HAMMER OPERATING WINDINGS H1-H144 and associated INHIBIT WINDINGS I1-I144 for causing the HAMMERS 160-1 through 144 to drive the paper FORMS 168 and a ribbon against the desired CHARACTERS 162-1 through 60 for printing.

While the technique of Read Only Storage control is applicable to any general configuration of the above-listed elements, this discussion is directed towards a configuration in which there are 144 PRINT HAMMERS 160-1 through 144 spaced 0.1 inch center to center. The PRINT ELEMENT 162 consists of a BELT **162*c* to which are fastened five sets or 300 engraved TYPE CHARACTERS 162-1 through 60 equally spaced around a belt at 4/3 × 0.1 inch center to center. The BELT 162*c* moves the TYPE 162-1 through 60 transversely in front of the HAMMERS 160-1 through 144 at a velocity of 100 inches per second. The print element position sensing means comprises a pair of electromagnetic transducers, namely, Home Pulse consisting of a SINGLE-TOOTHED EMITTER 32B, which together with a PICKUP HEAD 32D** (FIG. 3*b*), AMPLIFIER **32*el*, and a HOME PULSE TRIGGER 32F produces one pulse every 60 character times, and a PRINT SUBSCAN PULSE EMITTER 32A having four teeth for every character time and, which with a PICKUP HEAD 32C, AMPLIFIER 32*e*, and a SINGLE SHOT 32E emits 240 pulses in the interval between two Home Pulses. The printer under discussion is designed to operate with a print element having five identical arrays of 60 characters of each. It is equipped with a MAGNETIC CORE LINE BUFFER 20 (FIG. 1) having 144 character positions of 7 bits each. Each character of storage in the BUFFER 20 is used to store the coded characters for one of the 144 PRINT HAMMERS 160-1 through 144. In order to print the line it is necessary to determine the exact instant to impulse each hammer in order to impact the moving print element character represented by the coded character in that hammer's buffer storage location. This is accomplished by repetitively scanning the BUFFER 20 character by character, comparing each code as it is read out with the code for the print element character actually approaching alignment with the hammer at that instant, much in the manner described in U.S. Pat. No. 2,993,437, which issued on July 5, 1961, to F. M. Demer et al., and U.S. Pat. No. 3,066,601, which issued on Dec. 4, 1962, to H. E. Eden. The relative positions of the PRINT ELEMENT 162** and HAM- MERS 160–1–144 at a particular point in time are shown in FIG. 10. Since the center-to-center distance between characters on the PRINT ELEMENT 162 is 4/3 times the center-to-center distance between adjacent HAMMERS 160–1–144, it can be seen that if PRINT ELEMENT CHARACTER 162–1 is in alignment with HAMMER 160–1, then CHARACTER 162–4 will at the same instant line up with HAMMER 160–5, and so on, every third character being in alignment with every fourth hammer. A short time later CHARACTERS 162–2, -5, -8, etc., will line up with HAMMERS 160–2, -6, -10, etc. In order to perform one comparison for each of the 144 HAMMERS 160–1–144, it will be necessary to perform four partial scans (print subscans) of the BUFFER STORAGE 20, each subscan comparing one-fourth or 36 of the characters in storage with codes for the CHARACTERS 162–1, etc., actually arriving at the respective HAMMERS 160–1, etc. Therefore, on each subscan of the BUFFER STORAGE 20 the ADDRESS COUNTER 22 (FIG. 3*e*) must start at 0, 1, 2, or 3, depending on which fourth of the HAMMERS 160–1–144 will be aligned with PRINT ELEMENT CHARACTERS 162–1–60 on that subscan, and thereafter within the subscan it must increment by fours to 140, 141, 142, or 143, respectively. The starting value for each subscan is determined by counting PSS Pulses from the HOME PULSE TRIGGER 32F (FIG. 3*b*) with a 2-position binary counter, namely, the PRINT SUBSCAN COUNTER 32 (FIG. 3*e*). However, when the BUFFER STORAGE 20 (FIG. 1) is being loaded with a new line of information from an external source, the ADDRESS COUNTER 22 must be incremented by 1 from a starting value of 0 to a final value of 143 maximum.

While the BUFFER 20 is being scanned as described above, the sequence of CHARACTERS 162–1–60 actually passing the HAMMERS 160–1–144 must also be determined for comparison. As mentioned earlier, the printer being described uses five identical arrays of 60 characters each. The coded representations for the 60 characters are stored in the 2–8 bit positions R2 through R8 of the first 60 Columns 36A0–36A59 of the READ ONLY STORAGE 36. From FIG. 9 and the preceding discussion it can be seen that while every fourth BUFFER 20 position is addressed during a print subscan, every third Read Only Storage position must be addressed, if the characters are stored in the READ ONLY STORAGE 36 in the same sequential order as they appear on the print element. The counter which addresses the READ ONLY STORAGE 36 during print scan (CHARACTER COUNTER 42 (FIG. 3*h*)) must be so controlled that it will always address that part of the READ ONLY STORAGE 36 which contains the code for the character approaching the hammer whose corresponding buffer storage position is being addressed. In this embodiment of the printer this requires resetting the CHARACTER COUNTER 42 to 0 at the first PSS Pulse after Home Pulse, and incrementing by 3 each time the ADDRESS COUNTER 32 increments by 4 during a print scan. Controls are needed to cause the COUNTER 42 to assume the next correct value whenever it would otherwise increment past 59, there being only 60 characters in the set, hence, 60 READ ONLY STORAGE ADDRESSES numbered 0 through 59. Also, controls are needed to cause it to assume the correct starting value for each subscan after the one on which it was reset. The entire pattern or sequence is determined by three characteristics of the print mechanism: the number of characters in a complete set (in this case, 60), the number of hammers (in this case, 144), and a relative center-to-center spacing between adjacent print element characters and adjacent hammers (in this case, 4/3). Since, in the interval from Home Pulse to Home Pulse, each one of the 60 characters will pass every hammer and since four subscans are required to address every hammer once, it follows that the CHARACTER COUNTER 42 (FIG. 3*h*) in the interval from Home Pulse to Home Pulse will assume each of the 60 possible starting values four times. The starting value is only determined once in the interval by signals from the print element position SENSING DEVICES 32A and 32B (FIG. 3*b*) (first PSS Pulse after Home Pulse) and thereafter is determined by logical controls on the advance of the counter. It is therefore necessary to keep the CHARACTER COUNTER 42 operating continuously, whether printing or not, so that the Print Scan can begin on any one of the 240 subscan times between Home Pulses. The ADDRESS COUNTER 22 (FIG. 3*e*), on the other hand, has only four possible starting values which are determined by the continuously running 2-position PSS COUNTER 32.

During Print Scan there are 36 Buffer Memory Cycles and Read Only Storage Read Cycles (¼ × 144) on each subscan. These are counted by the MEMORY CYCLE COUNTER 58 (FIG. 3*a*). The MEMORY CYCLE COUNTER 58 is provided with DECODE ANDs 58a–*d* and ORs 58*e–f*, and is also used to gate other events within a subscan. Events within a Memory Cycle are gated by the PRINT CLOCK 54 having DECODE ANDs 55*a–c*. The PRINT CLOCK 54 is reset from a RESET LATCH 54L, which is set by PSS Pulse and driven by a 1 MHz OSCILLATOR 50 between resets. The MEMORY CYCLE COUNTER 58 is driven by a particular value T7 of the PRINT CLOCK 54, thus, making it in effect an extension of the PRINT CLOCK 54.

The sequence of major events in each Memory Cycle during use of the READ ONLY STORAGE 36 is as follows: Each 6-microsecond Memory Cycle is determined by the OSCILLATOR 50 and the PRINT CLOCK 54. The sequence of events is illustrated in FIG. 11. As shown, the first event in the cycle is reset over LINE 14R of the DATA REGISTER 14 (FIG. 3*k*) by the Data Register Reset Signal, which is generated at AND 48*j* through OR 48*f* (FIG. 3*b*). This is followed by readout of the READ ONLY STORAGE 36 (FIG. 3*i*) position containing the code for the PRINT ELEMENT CHARACTER 162 then approaching the HAMMER 160, which is to be addressed on this cycle. Addressing of the READ ONLY STORAGE 36 is under the control of the CHARACTER COUNTER 42 (FIG. 3*h*). Since a bit is represented in the READ ONLY STORAGE 36 by a missing capacitor (i.e., a hole in the card), the contents of the DATA REGISTER 14 (FIG. 3*i*) will now be the bit complement of the coded character. Next, the buffer storage position, which contains the code for the character which is intended to print in the hammer position now being addressed, is read into the DATA REGISTER 14 from the PRINT LINE BUFFER 20 over BIT LINES 20–2S through 20–8S, being binary added bit for bit to the data previously read from the READ ONLY STORAGE 36 (FIG. 3*i*) into the DATA REGISTER 14 (FIG. 3*k*). Addressing of the BUFFER STORAGE 20 is under the control of the ADDRESS COUNTER 22 (FIG. 3*e*). Since the BUFFER STORAGE 20 presents the uncomplemented code to the DATA REGISTER 14, all seven BIT TRIGGERS 14–2 through 14–8 of the REGISTER 14 will now be set, if, and only if, the character read from the BUFFER STORAGE 20 was identical to the character read from the READ ONLY STORAGE 36. If this condition exists, COMPARE LATCH 66L (FIG. 31) is set through AND 66A, OR 66*a*, and AND 66*b*, and a bit is set into the PRINT SHIFT REGISTER 62 (FIG. 3*c* ) from AND 66*c*, which will later cause a properly timed pulse to the selected HAMMER COIL 64–1–144. If the COMPARE LATCH 66L was set, it will remain set until the beginning of the next Memory Cycle and will force the code for a blank space (BIT 8) to be stored in the BUFFER STORAGE 20 location now being addressed through operation of the INHIBIT DRIVERS 30–2 through 30–8 (FIG. 31). BUFFER STORAGE 20 will thus be caused to contain all coded blanks (8 bit only) when the entire line has been printed. This condition is indicated by the Line Complete Signal from AND 72*i* (FIG. 3*m*), which is generated by counting four successive subscans in which every Memory Cycle indicates either compare or space through operation of the TRIGGERS 72*g* and 72*h*, which operate as a counter. The Line Complete Signal terminates printing and initiates the specified carriage operation. If two Home Pulses are passed during a print operation without a Line Complete Signal having been generated, an UNASSIGNED CHARACTER LATCH 174 (FIG. 3*k*) is set through AND 174A, INVERTER 174I, and TRIGGER 174E, indicating that BUFFER STORAGE 20 contained at least one character which was not contained in the READ ONLY STORAGE 36 (FIG. 3*j*). This would normally be a user error and the test prevents indefinite scanning for a nonexistent character. Whether the compare condition exists or not, the DATA REGISTER 14 (FIG. 3*k*) should contain an odd number of bits after readout of the BUFFER STORAGE 20 (FIG. 1) and this condition is tested at the VALIDITY CHECK LATCH VC1 72*g* (FIG. 3m) at the same time that the compare condition is tested. If the compare condition did not exist, the DATA REGISTER 14 (FIG. 3*k*) will now contain a "hash" character formed by the bit-by-bit binary addition of the character from the READ ONLY STORAGE 36 (FIG. 3*j*) and the BUFFER STORAGE 20 (FIGS. 1 and 3*f*–3*g*). The BUFFER STORAGE 20 position will be blank because of the destructive read characteristic of core storage. It is necessary to reconstruct the character as read from BUFFER STORAGE 20 so that it can be read back in for comparison on subsequent subscans. This is parity accomplished by again reading from the same READ ONLY STORAGE 36 ADDRESS. This is done during a second ROS 36 readout in response to a second Character Sample Signal from AND 53 (FIG. 3*b*) which, as shown in FIG. 11, has outputs at 2, NOT 4 and 4, NOT 2 of the Print Clock, through Exclusive OR 53A, when the output of a SCAN GATE TRIGGER 51*a* is up at AND 48*c*. This signal resets the READ LATCH 48R through OR 53*b* and produces the ROS Readout Signal at OR 115 (FIG. 3*s*). The second binary entry of the READ ONLY STORAGE 36 character into the DATA REGISTER 14 cancels the first, and the bits remaining in the REGISTER 14 should then represent the character originally read from the BUFFER STORAGE 20. The operation is checked with a second odd parity test VALIDITY CHECK TRIGGER VC2 72*h* (FIG. 3*m*) and the DATA REGISTER 14 representation is entered into BUFFER STORAGE 20, while simultaneously the CHARACTER COUNTER 42 (FIG. 3*h* ) is advanced in preparation for the first READ ONLY STORAGE 36 read of the Memory Cycle.

IV. OFF-LINE TESTS

In order to test the operation of the printer independently of computers for maintenance purposes, it is desirable to provide a means for filling the BUFFER 20 (FIG. 1) with predetermined test patterns for printing. Since the READ ONLY STORAGE 36 (FIGS. 1 and 3*j*) is coded with all the characters on the PRINT ELEMENT 162 installed in the machine, it can be used as a convenient source of such test data. Off-line testing is performed with the FORMAT SELECT SWITCH 77 (FIG. 3*v*) in the Test Position. The LINES COUNTER 40 (FIGS. 3*p*–3*q*) is used to address the READ ONLY STORAGE 36 (FIG. 3*j*) to obtain data for entry into BUFFER STORAGE 20 (FIGS. 1 and 3*f*) in lieu of external data from a processor. During buffer store time in this mode of operation the LINES COUNTER 40 addresses the READ ONLY STORAGE 36 to read a character for entry into the BUFFER 20, and then the LINES COUNTER 40 is incremented by 1 through AND 99*b* (FIG. 3*t*) to read the next Read Only Storage character for entry into the next buffer address and so on until the BUFFER 20 is full. The LINES COUNTER 40 will have received 144 advances during this process. Since it is a Modulo 128 COUNTER, an additional 112 advances (2 × 128–144) will bring it back to its starting point at the beginning of buffer load. These additional advances are made during the time that the PRINT START LATCH 175 (FIG. 3*g*) is on from AND 175*a*, BUFFER FULL LATCH 176 through AND 99*a* (FIG. 3*t*), that is, during the first print subscan. The reset of the PRINT START LATCH 175 (FIG. 3*g*) is chosen so that its duration will be such that it can be used to gate exactly 112 Clock Pulses into the LINES COUNTER 40 drive to effect this adjustment. When printing of the line is complete, a Single Space carriage operation is forced through AND 99 (FIG. 3*t*), which causes the LINES COUNTER 40 to advance by 1 in the normal manner with line spacing. In this way the starting value for the LINES COUNTER 40 will be one greater for each succeeding line. This has the effect of causing the test pattern to be a diagonal pattern of all available characters. All the requirements of this operation are gated by the Signal CE TEST ON from FORMAT SELECT SWITCH 77 (FIG. 3*u*).

While the invention has been particularly shown and described with reference to a preferred embodiment thereof, it will be understood by those skilled in the art that various changes in form and details may be made therein without departing from the spirit and scope of the invention.

What is claimed is:

1. In a control system for a printer having a type character bearing element movable to present different type characters at a plurality of print positions, a plurality of print hammers having control means operable to effect impact between selected ones of said type characters and a document on which a printing operating is to be performed, and a carriage having drive means controlled by carriage drive control means to advance said document for printing thereon at different line positions, a first storage means having a plurality of storage positions storing coded representations of characters to be printed on said document and having readout means for in turn reading out said coded representations to be printed at each of a plurality of positions on said document, a second storage means having a plurality of storage positions storing coded representations of type characters on said type character bearing element and having readout means for in turn reading out said type character coded representations for said type characters on said type character bearing element located instantaneously at each of said plurality of positions on said document, a single multi-bit register, circuit means connecting both of said storage means sequentially to said multi-bit register to control the condition of said multi-bit register in accordance with said readouts of said representations of a character to be printed and a character on said character bearing element located at one of said print positions, and additional circuit means connecting said multi-bit register to said print hammer control means to effect a selective operation of said print hammers in accordance with a predetermined condition of said register after said readouts.

2. The invention as defined in claim 1 characterized by one of said storage means comprising a magnetic core storage device storing a binary coded representation of each of said characters to be printed and the other of said storage means comprising a read only capacitor storage device having a readout which is the complement of the binary coded representation of the characters on said character bearing element, said circuit means causing the readout from both of said storage means to be sequentially entered into said multi-bit register in a bit-by-bit parallel binary addition operation without carry such that the contents of said multi-bit register are all one bits if and only if the character representation read from one of said storage means is identical to the character representation read in complement form from the other of said storage, and said additional circuit means including compare means comprising an AND circuit having an output connected to said print hammer control means and having a plurality of inputs with one of said plurality of inputs being connected to each position of said multiposition register.

3. The invention as defined in claim 2 characterized by said circuit means including also means connected to said second storage means readout means to provide a second readout of the type character coded representations to reconstruct in said single multi-bit register a coded representation readout of said first storage means into said single multi-bit register.

4. The invention as defined in claim 2 characterized by said read only storage device having more bit positions per storage position than said multi-bit register, and circuit means connecting said read only storage device bit positions to said register in two separate groups.

5. The invention as defined in claim 4 characterized by a line counter connected to said read only storage device to address said read only storage device and circuit means connected to said read only storage device to enable readout of one group of bit positions and inhibit said other group of bit positions.

6. The invention as defined in claim 5 characterized by the read only storage device having two groups of bit positions representing carriage control signals in each of a limited number of storage positions which number is less than the maximum number of lines for a document, said line counter having sufficient stages to provide a count of double said limited number of storage positions in each group of bit positions of the read only storage device, and means including a plurality of gate devices connected to said data register and to different stages of said line counter to gate bits from one of said two groups of read only storage device bit positions during the first half portion of the lines counter count, and from the other of said two groups during the second half of the lines counter count.

7. The invention as defined in claim 2 characterized by an address counter connected to clock means for addressing the different storage positions of said magnetic core storage device.

8. The invention as defined in claim 7 further characterized by format search circuit means connected to said read only storage means to address said one group of bit positions containing representations of a carriage control signal and connected to said address counter for operating said address counter to count said carriage control signals in said read only storage means.

9. The invention as defined in claim 8 characterized by circuit means connecting said line counter to said format search circuit means, a check trigger connected to said carriage control means and compare means connected to said line counter and said check trigger for checking carriage operations.

10. The invention as defined in claim 9 characterized by circuit means connecting said read only storage means to said magnetic core storage means through said multi-bit register for loading said magnetic core storage means from said read only storage means, and means connected to said lines counter to force a single space carriage operation and advance the lines counter one count whereby each subsequent loading of the magnetic core storage means from said read only storage means is advanced one address position to cause said printer to print a diagonal print test pattern from representations in said read only storage means.

11. The invention as defined in claim 9 characterized by said read only storage device containing 1, NOT 2 heading line codes in one or more storage positions, and an operation counter connected to be responsive to a predetermined channel number skip command, a block counter connected to said multi-bit register of the read only storage device to be advanced by each readout of carriage control 1, NOT 2 heading line codes stored in said storage device, and compare means connected to said operation counter and said block counter for stopping said line counter when the count of said block counter equals the count of said operation counter.

* * * * *